(12) United States Patent
Davis et al.

(10) Patent No.: US 9,588,921 B2
(45) Date of Patent: Mar. 7, 2017

(54) SYSTEM ON A CHIP COMPRISING AN I/O STEERING ENGINE

(71) Applicant: Amazon Technologies, Inc., Seattle, WA (US)

(72) Inventors: Mark Bradley Davis, Austin, TX (US); David James Borland, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 5 days.

(21) Appl. No.: 14/623,914

(22) Filed: Feb. 17, 2015

(65) Prior Publication Data

US 2016/0239445 A1    Aug. 18, 2016

(51) Int. Cl.
*G06F 13/364* (2006.01)
*G06F 13/12* (2006.01)
*G06F 13/00* (2006.01)
*H04L 29/06* (2006.01)

(52) U.S. Cl.
CPC ............ *G06F 13/364* (2013.01); *G06F 13/00* (2013.01); *G06F 13/122* (2013.01); *G06F 13/128* (2013.01); *H04L 63/00* (2013.01)

(58) Field of Classification Search
CPC ...... G06F 13/364; G06F 13/00; G06F 13/128; G06F 13/122; H04L 63/00
See application file for complete search history.

(56) References Cited

U.S. PATENT DOCUMENTS

| | | | |
|---|---|---|---|
| 7,412,588 B2 | 8/2008 | Salapura et al. | |
| 8,082,547 B1 | 12/2011 | Herington et al. | |
| 2007/0094419 A1 | 4/2007 | Rajendran | |
| 2007/0209037 A1* | 9/2007 | Sato | G06F 9/4881 718/107 |
| 2007/0217439 A1 | 9/2007 | Lemaire et al. | |
| 2008/0086583 A1 | 4/2008 | Nanda et al. | |
| 2008/0172524 A1* | 7/2008 | Singh | G06F 12/1027 711/108 |
| 2009/0228684 A1 | 9/2009 | Ramesh et al. | |
| 2012/0079155 A1 | 3/2012 | Damodaran et al. | |

(Continued)

FOREIGN PATENT DOCUMENTS

WO        2003029995        4/2003

OTHER PUBLICATIONS

U.S. Appl. No. 14/578,004, filed Dec. 19, 2014, Titled: System on a Chip Comprising Multiple Compute Sub Systems.

(Continued)

*Primary Examiner* — Ernest Unelus
*Assistant Examiner* — Ronald Mood
(74) *Attorney, Agent, or Firm* — Kilpatrick Townsend & Stockton LLP

(57) ABSTRACT

Embodiments of the technology can provide steering of one or more I/O resources to compute subsystems on a system-on chip (SoC). The SoC may include a first I/O subsystem comprising a plurality of first I/O resources and a second I/O subsystem comprising a plurality of second I/O resources. A steering engine may steer at least one of the first I/O resources to either a network compute subsystem or to a server compute subsystem and may steer at least one of the second I/O resources to either the network compute subsystem or to the server compute subsystem.

18 Claims, 18 Drawing Sheets

(56) References Cited

U.S. PATENT DOCUMENTS

| | | | |
|---|---|---|---|
| 2013/0138836 A1* | 5/2013 | Cohen | H04L 49/351 |
| | | | 709/250 |
| 2013/0268706 A1 | 10/2013 | Yun et al. | |
| 2014/0100837 A1 | 4/2014 | Heinen et al. | |
| 2014/0101419 A1 | 4/2014 | Giddi et al. | |
| 2014/0254388 A1 | 9/2014 | Kumar et al. | |

OTHER PUBLICATIONS

U.S. Appl. No. 14/578,010, filed Dec. 19, 2014, Titled: System on a Chip Comprising Reconfigurable Resources for Multiple Compute Sub Systems.
U.S. Appl. No. 14/622,661, filed Feb. 13, 2015, Titled: Multi-Mode System on a Chip.
PCT/US2016/018236, "International Search Report and Written Opinion," mailed May 31, 2016, 9 pages.

\* cited by examiner

SYSTEM ON A CHIP COMPRISING AN I/O STEERING ENGINE

BACKGROUND

Many organizations and companies provide computing services over a plurality of communication networks. For example, computing services may include web services such as web storage or virtual servers that can be provided over the Internet to different clients. In some instances, virtual servers may be rented out to clients on as needed basis.

Generally, a system may include multiple subsystems to perform various different functions. In most instances, each subsystem may utilize fixed computing and I/O resources to perform the intended function. Thus, I/O bandwidth of each subsystem may be limited by the allocated I/O resources. Hence, each subsystem may be limited to providing a level of performance based on the assigned computing and I/O resources.

BRIEF DESCRIPTION OF THE DRAWINGS

Various embodiments in accordance with the present disclosure will be described with reference to the drawings, in which.

DETAILED DESCRIPTION

Figure 1:
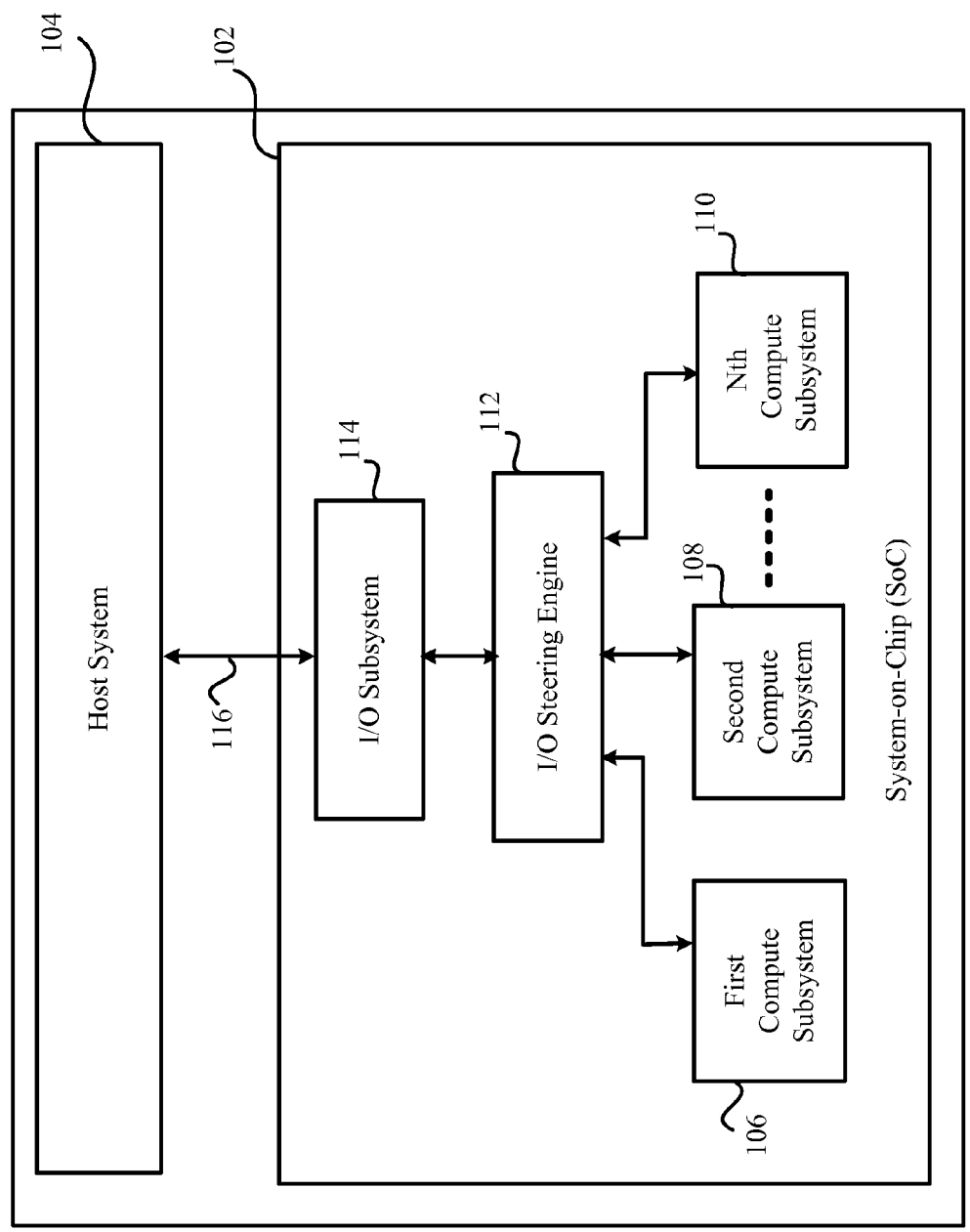
FIG. 1 illustrates a block diagram of a system comprising a plurality of compute subsystems according to some embodiments of the disclosed technology.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Generally, a computing system may include one or more compute subsystems to perform several different functions. In some instances, a system may be running a number of virtual server instances that may require more network bandwidth to accommodate multiple applications. However, in most instances, each compute subsystem may include a fixed number of compute and I/O resources. Thus, each compute subsystem may be limited to providing a level of performance based on the allocated I/O resources. In some instances, I/O resources on a system may not be used efficiently. For example, if a compute subsystem is not functional, the I/O resources allocated to that compute subsystem may not be used by other compute subsystems. This may result in underutilizing the I/O resources at the system level.

Embodiments of the disclosed technology can provide steering of one or more I/O resources to more than one compute subsystems on a system-on chip (SoC). For example, the SoC may be communicatively coupled to a host system (e.g., an x86 server) to provide various services such as traffic monitoring, traffic shaping, computing, etc. In some embodiments, the SoC may include multiple compute subsystems to perform various functions. For example, according to certain embodiments, the SoC may include a server compute subsystem for providing compute services and a network compute subsystem for at least managing network traffic for the host system and the server subsystem. The SoC may include a first I/O subsystem comprising a plurality of first I/O resources and a second I/O subsystem comprising a plurality of second I/O resources. In embodiments of the disclosed technologies, a steering engine may be configured to steer at least one of the first I/O resources to either the network compute subsystem or to the server compute subsystem and to steer at least one of the second I/O resources to either the network compute subsystem or to the server compute subsystem. For example, the SoC may be configured with a range of configurations to perform different functions (e.g., high performance networking, high performance compute, etc.) that may require reconfiguration of different compute subsystems. Embodiments of the disclosed technologies can steer the I/O resources to different subsystems accordingly to match the needed I/O resources for each configuration thus allowing more efficient use of the I/O resources for each compute subsystem and increasing the throughput of the system.

Computer networks may typically include a plurality of servers that can host data and provide services to multiple clients or organizations. For example, servers can provide services such as cloud computing, analytics, web services, storage, databases, applications, deployment services, etc. to a potentially larger number of client computers. The clients or organizations can use these services or data to power a wide variety of workloads such as storage, data processing and warehousing, web and mobile applications, archive and many other tasks. Generally, clients request services or data from the servers and the servers respond by executing certain tasks to service the request and/or provide the data over the network. The network traffic may vary depending upon a number of factors such as number of clients requesting services at a certain time, capacity of the servers, etc.

In some instances, a network system can monitor network traffic to regulate the traffic and to minimize bandwidth congestion. For example, the network system may be communicatively coupled to a host system (e.g., an x86 server) that provides web services to different clients. The network system may include one or more processor cores, caches, network acceleration logic, memory controllers and an I/O subsystem, etc. In some embodiments, the network system may also perform other functions such as traffic shaping, network storage processing, etc. associated with the web services offered by the server (e.g., host system). In some instances, the functionality of the network system may be implemented as a network compute subsystem on a System-on-Chip (SoC) that may be communicatively coupled to the host system. For example, the SoC can be coupled to the host system (e.g., one or more servers) using a plug-in card or by being soldered on the motherboard of the host system.

In some embodiments, the SoC may also include a server compute subsystem and a management compute subsystem in addition to the network compute subsystem. For example, the server compute subsystem may be configured to provide compute services and the management compute subsystem may be configured to manage the resources for the network compute subsystem and the server compute subsystem. In some instances, the network compute subsystem and the server compute subsystem may include fixed resources. For example, the resources may include processing resources (e.g., processor cores), memory resources (e.g., (e.g., Level 1 (L1) caches, Level 2 (L2) caches, Level 3 (L3) or last level caches, memory controllers, memory channels, etc.) and I/O resources (e.g., peripheral devices, network and bus interfaces).

Generally, each compute subsystem on the SoC may be designed with a fixed number of processing and memory resources. In most instances, a fixed number of I/O resources may be allocated to each compute subsystem by hardware design. In certain instances, when the SoC is configured to include asymmetric compute subsystems (e.g., one compute subsystem has more processing and memory resources than the other compute subsystem), each compute subsystem may be limited by its allocated I/O resources. Therefore, the network bandwidth and the server bandwidth provided by the SoC may be limited by the fixed I/O bandwidth for each compute subsystem.

Furthermore, in some instances, some of the I/O resources may result in being underutilized based on the configuration of the SoC. For example, if the SoC is configured to only provide server compute services, the network I/O resources may not be utilized. Similarly, if the SoC is configured to only provide network compute services, the server I/O resources may not be utilized. Hence, the I/O bandwidth of the SoC may not be utilized efficiently, thus decreasing the throughput of the system.

Embodiments of the disclosed technologies can provide steering of I/O resources to more than one compute subsystems on a system-on chip (SoC). In some embodiments, a compute subsystem may include a subsystem with one or more processing cores. The SoC may be communicatively coupled to a host system (e.g., an x86 server) to provide various services such as traffic monitoring, traffic shaping, computing, etc. In some embodiments of the technology, the SoC may include multiple subsystems such as a server compute subsystem to provide compute services, a network compute subsystem to at least manage the network traffic for the host system and the server compute subsystem, a management compute subsystem to manage the resources, a first I/O subsystem with a plurality of first I/O resources, a second I/O subsystem with a plurality of second I/O resources and an accelerator subsystem comprising a plurality of accelerators. In certain embodiments, a single I/O subsystem may be used for managing I/O requests for the network compute subsystem and the server compute subsystem.

In certain embodiments of the technology, an I/O steering engine may be configured to steer at least one of the plurality of first I/O resources to the server compute subsystem or to the network compute subsystem and to steer at least one of the plurality of second I/O resources to the server compute subsystem or to the network compute subsystem. In some embodiments, the I/O steering engine may steer the I/O resources based on a steering configuration provided by the management compute subsystem. In some embodiments, the management compute subsystem may provide the steering configuration to the I/O steering engine to steer one or more I/O resources at power-up or dynamically at run-time. The I/O steering engine may be coupled to the first I/O subsystem, second I/O subsystem, network compute subsystem and the server compute subsystem. In certain instances, when the SoC is configured to include asymmetric compute subsystems (e.g., one compute subsystem has more processing and memory resources than the other compute subsystem), the I/O steering engine may provide the flexibility of steering the appropriate I/O resources to each compute subsystem. In some other instances, when the SoC is configured to provide networking only services, the I/O steering engine may steer both first and second I/O resources to the network compute subsystem and when the SoC is configured to provide server compute only services, the I/O steering engine may steer both first and second I/O resources to the server compute subsystem. In certain embodiments of the technology, the I/O steering engine may also be configured to steer at least one of the accelerators to the server compute subsystem or to the network compute subsystem. For example, in some instances, when the SoC is configured to provide networking only services, the I/O steering engine may steer all the I/O resources and the accelerators to the network compute subsystem.

According to certain embodiments of the disclosed technology, the management compute subsystem may provide a steering configuration to the I/O steering engine for steering the I/O resources and the accelerators to the appropriate compute subsystem. In some embodiments, the management compute subsystem may determine that both the network compute subsystem and the server compute subsystem may be functional and may provide a steering configuration to the I/O steering engine for steering the first I/O resources to the network compute subsystem and the second I/O resources to the server compute subsystem. In some embodiments, the management compute subsystem may provide a steering configuration to both the compute subsystems based on the allocation of processing and memory resources to both the compute subsystems. In certain embodiments, the management compute subsystem may determine that the server compute subsystem may not be functional and may provide a steering configuration to the I/O steering engine for steering the first I/O resources and the second I/O resources to the network compute subsystem. In certain embodiments, the management compute subsystem may determine that the network compute subsystem may not be functional and may provide a steering configuration to the I/O steering engine for steering the first I/O resources and the second I/O resources to the server compute subsystem. In some embodiments, steering configuration of the first I/O resources and the second I/O resources may be based on a default configuration. In some embodiments, the management compute subsystem may determine the steering configuration of the first I/O resources and the second I/O resources at power-up based on hardware configuration (e.g., pins or fuses) or software configuration (e.g., data field of a software register). In some embodiments, the management compute subsystem may determine the steering configuration dynamically and provide it to the I/O steering engine at run-time. For example, the management compute subsystem may determine that the network compute subsystem is utilizing more compute resources at a certain time as compared to the server compute subsystem. Thus, in some implementations, the management compute subsystem may update the steering configuration dynamically for steering the appropriate I/O resources to the network compute subsystem to match up with the compute resources utilized by the network compute subsystem. A cache coherent fabric bridge can map each configured I/O resource to a physical layer that may be associated with a compute subsystem.

A typical SoC may include functionalities of a system integrated into a single chip. For example, an SoC can include multiple processor cores, volatile and non-volatile memory modules, memory controllers, one or more internal buses, standard interfaces, peripherals, voltage regulators, power management circuits, timing resources such as oscillators and phase locked loop, etc. Implementing the functionalities of multiple chips on a single chip can reduce manufacturing and assembly costs. In addition, the SoCs generally have smaller footprints and space requirements. Therefore, SoC implementations generally consume less power and are more cost effective as compared to a multichip system implementing the same functionality.

Embodiments of the disclosed technologies can provide the flexibility of steering the I/O resources to more than one compute subsystems on a SoC. The ability to better utilize the I/O resources on the SoC can result in improved network and storage bandwidth provided by the host system for various compute services.

Although, embodiments of the disclosed technology are described and shown steering the I/O resources between two compute subsystems on the SoC, aspects of the disclosed technology are not limited to steering the I/O resources only between two compute subsystems. For example, in some implementations, the I/O resources may be steered among multiple compute subsystems (e.g., more than two) on a SoC without deviating from the scope of the disclosed technology.

FIG. 1 illustrates an exemplary system 100 that can be used for performing embodiments described herein. Generally, a SoC can include an I/O subsystem comprising a plurality of I/O resources. One or more of the plurality of I/O resources can be steered to a plurality of compute subsystems using an I/O steering engine.

FIG. 1 illustrates an SoC 102 configured to communicate with a host system 104. In some instances, the host system 104 may provide a multi-tenant platform to multiple clients. For example, the host system 104 may provide services such as cloud computing, cloud storage, analytics, web services, databases, applications, deployment services, website hosting, etc. to different clients. The host system 104 may include a server, for example, an x86 server. In some embodiments, one or more processors in the host system 104 may be connected to the sockets on the SoC 102.

The SoC 102 may include a plurality of compute subsystems such as a first compute subsystem 106, a second compute subsystem 108 and an $N^{th}$ compute subsystem 110. For example, in some instances, the plurality of compute subsystems may include two or more compute subsystems. The SoC 102 may also include an I/O subsystem 114 and an I/O steering engine 112. The I/O subsystem 114 may communicate with the host system 104 using an interface 116. The interface 116 may be based on a standard interface such as Peripheral Component Interconnect Express (PCIe).

In some embodiments, the first compute subsystem 106 may be configured as a network compute subsystem and the second compute subsystem 108 may be configured as a server compute subsystem. For example, the first compute subsystem 106 may be configured for at least managing network traffic for the host system 104. In some embodiments, the first compute subsystem 106 may perform network related functionalities such as network traffic shaping, network acceleration, network storage processing, etc. In some embodiments, the second compute subsystem 108 may be configured to provide compute services. For example, compute services may include launching virtual machine instances of various sizes, associating storage volumes to the virtual machines, data processing, etc.

The I/O subsystem 114 may include a plurality of I/O resources. In some embodiments, the plurality of I/O resources may include I/O devices and various I/O interfaces for internal and external communication. For example, the I/O subsystem 114 may include one or more Ethernet MACs (Media Access Control), PCIe devices, UARTs (Universal Asynchronous Receivers/Transmitters), I2C (Inter-Integrated Circuit), GPIOs (General Purpose Input/Output), SATA (Serial ATA) controllers, SPI (Serial Peripheral Interface) ports and any other suitable device.

The I/O steering engine 112 may be configured to steer or direct at least one of the plurality of I/O resources to one or more compute subsystems in the plurality of compute subsystems. For example, in some embodiments, the I/O steering engine 112 may be configured to steer one or more of the I/O resources to the first compute subsystem 106, to the second compute subsystem 108 or to both the first compute subsystem 106 and the second compute subsystem 108. In some embodiments, the I/O steering engine may include a steering matrix, a cross bar, a mesh, multiplexers, demultiplexers, etc. However, other implementations of the I/O steering engine are possible.

Figure 2:
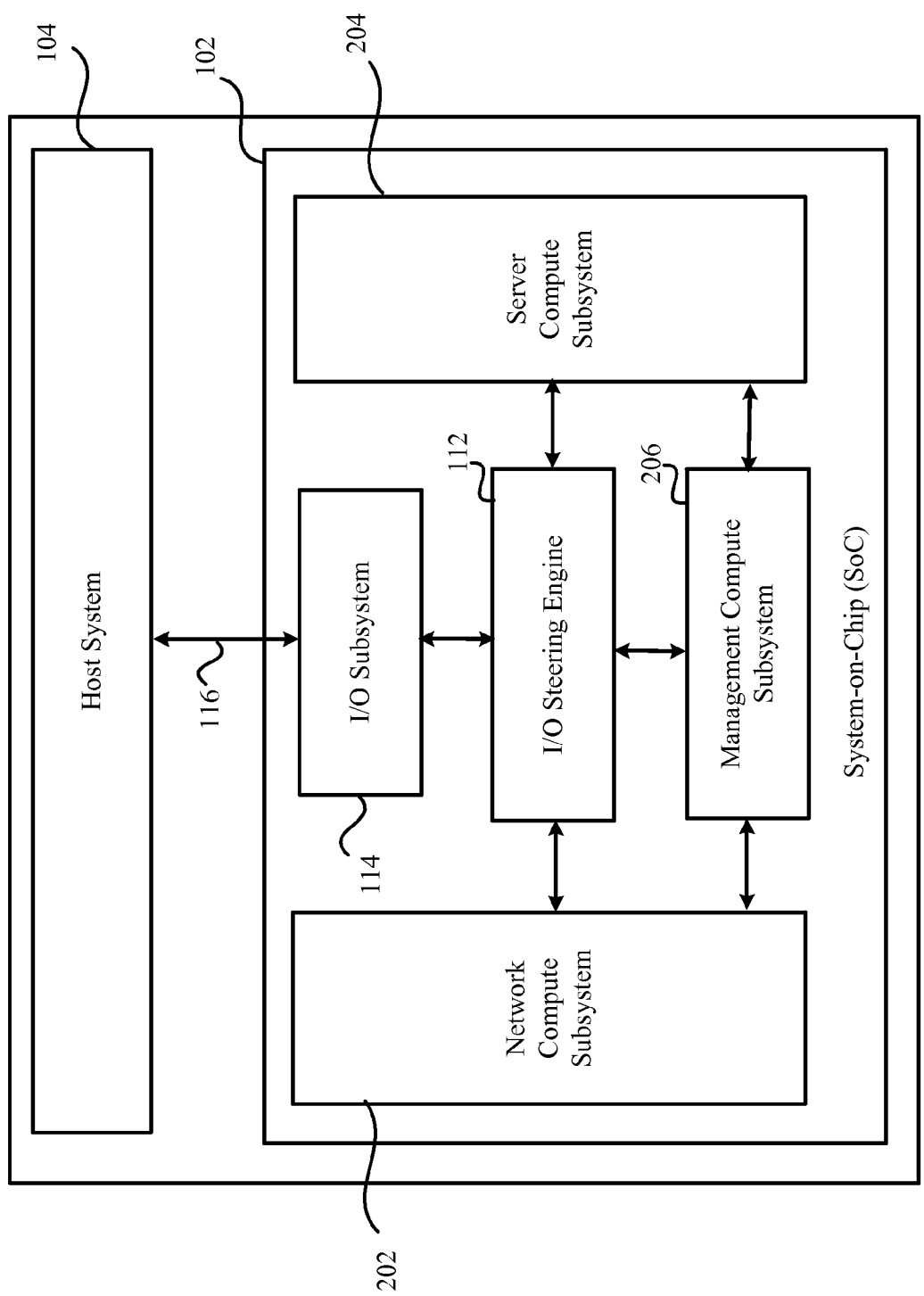
FIG. 2 illustrates a block diagram of a system according to some embodiments of the technology.

FIG. 2 illustrates an exemplary system 200 that can be used for performing embodiments described herein. Generally, a SoC can include an I/O subsystem comprising a plurality of I/O resources that can be steered to a network compute subsystem or a server compute subsystem using an I/O steering engine.

FIG. 2 illustrates the SoC 102 configured to communicate with the host system 104 via the interface 116 as discussed with reference to FIG. 1. The SoC 102 may include a network compute subsystem 202, a server compute subsystem 204, the I/O subsystem 114, the I/O steering engine 112 and a management compute subsystem 206. In some embodiments, the network compute subsystem 202 may be the first compute subsystem 106 and the server compute subsystem 204 may be the second compute subsystem 108, as discussed with reference to FIG. 1.

The network compute subsystem 202 may be configured to provide network related functionalities such as network traffic shaping, network acceleration, network storage processing, etc. In some embodiments, the network compute subsystem 202 may include at least some functionalities of a network interface controller (NIC) or a network coprocessor. In certain embodiments, the network compute subsystem 202 may include some functionalities related to web services offered by the host system 104, for example, billing, rate, traffic shaping, encryption, choking, etc.

The server compute subsystem 204 may be configured to provide compute services, e.g., virtual or physical resources for the host system 104. For example, compute services may include launching virtual machine instances of various sizes, associating storage volumes to the virtual machines, etc. on demand. In some embodiments, the server compute subsystem 204 may be used to offload some of the work load of the host system 104. In some instances, the host system 104 together with the server compute subsystem 204 may provide high performance compute services. For example, the host system 104 may focus on processing quick turnaround services and may offload low performance work load to the server compute subsystem 204 thus increasing the throughput of the system.

The I/O subsystem 114 may include a plurality of I/O resources. In embodiments of the disclosed technology, the plurality of I/O resources may be used by the network compute subsystem 202 or by the server compute subsystem 204 to match the throughput requirement of the system. In some embodiments, the plurality of I/O resources may include peripheral devices and various I/O interfaces for internal and external communication. For example, the I/O subsystem 114 may include a first interface to communicate with the host system 104 (e.g., the interface 116), a second interface to communicate with the I/O steering engine 112 and a third interface to communicate with the network (e.g., Internet, Intranet). In some embodiments, the I/O subsystem 114 may also include one or more I/O devices such as Ethernet MACs (Media Access Control), PCIe devices, UARTs (Universal Asynchronous Receivers/Transmitters), I2C (Inter-Integrated Circuit), GPIOs (General Purpose Input/Output), SATA (Serial ATA) controllers, SPI (Serial Peripheral Interface) ports and any other suitable peripheral device.

In some embodiments, the I/O subsystem 114 may include a pool of I/O resources such as one or more SATA controllers, Ethernet MACs, PCIe devices, SERDES I/O multiplexers, GPIOs, UARTs, etc. that can be steered to the network compute subsystem 202 or to the server compute subsystem 204. In one embodiment, all the resources in the I/O subsystem 114 can be steered to the network compute subsystem 202 or to the server compute subsystem 204. In another embodiment, the steering can be performed on a device-by-device basis. For example, a first set of I/O devices may be steered to the network compute subsystem 202, a second set of I/O devices may be steered to the server compute subsystem 204 and a third set of I/O devices may be steered to both the network compute subsystem 202 and to the server compute subsystem 204. In some embodiments, more number of I/O resources may be steered to the network compute subsystem 202 than to the server compute subsystem 204 or vice-versa. For example, depending on the configuration of the SoC 102 (e.g., high performance networking or high performance compute server), more number of I/O resources may be utilized by a compute subsystem to match up with the compute resources utilized by that compute subsystem.

In some embodiments, the I/O subsystem 114 may include a first I/O subsystem and a second I/O subsystem, as will be discussed with reference to FIG. 3. For example, the first I/O subsystem may include a plurality of first I/O resources for the network compute subsystem 202 and the second I/O subsystem may include a plurality of second I/O resources for the server compute subsystem 204. In some embodiments, the first I/O subsystem may include more I/O resources than the second I/O subsystem or vice-versa. For example, in one instance, the first I/O subsystem may include more number of Ethernet MACs and UARTs as comparted to the second I/O subsystem.

The I/O steering engine 112 may be configured to steer at least one of the plurality of I/O resources to the network compute subsystem 202 or to the server compute subsystem 204. In some embodiments, the I/O steering engine may include a steering matrix, a cross bar, a mesh, multiplexers, de-multiplexers, etc. However, other implementations of the I/O steering engine are possible. In some embodiments, the I/O steering engine 112 may steer the I/O resources based on a steering configuration provided by the management compute subsystem 206. In some embodiments, the number of I/O resources steered by the I/O steering engine 112 to one or more compute subsystems may vary dynamically. In certain instances, when the SoC 102 is configured to include asymmetric compute subsystems (e.g., one compute subsystem has more processing and memory resources than the other compute subsystem), the I/O steering engine 112 may provide the flexibility of steering the appropriate number of I/O resources to each compute subsystem. For example, if the network compute subsystem 202 has more processing and memory resources (e.g., SoC 102 is configured to provide high performance networking services), the I/O steering engine 112 may steer an appropriate number of I/O resources to match the needed I/O resources for the throughput requirement of the network compute subsystem 202. Similarly, if the server compute subsystem 204 has more processing and memory resources (e.g., SoC 102 is configured to provide high performance server computing services), the I/O steering engine 112 may steer an appropriate number of I/O resources to match the needed I/O resources for the throughput requirement of the server compute subsystem 204. In some instances, when the SoC 102 is configured to provide networking only services, the I/O steering engine 112 may steer all the I/O resources to the network compute subsystem 202 and when the SoC 102 is configured to provide server compute only services, the I/O steering engine 112 may steer all the I/O resources to the server compute subsystem 204.

In some embodiments, the management compute subsystem 206 may be configured to be the first to run upon a cold power on of the entire SoC 102. In some embodiments, the management compute subsystem 206 may determine a configuration of the SoC 102 at power up. For example, in some embodiments, configuration of the SoC 102 may include configuration of the compute subsystems and configuration of the processing and memory resources for each compute subsystem. In some embodiments, the management compute subsystem 206 may be configured to determine a steering configuration based on the configuration of the SoC 102 and provide the steering configuration to the I/O steering engine 112 for steering the appropriate I/O resources to one or both the compute subsystems. For example, the management compute subsystem 206 may determine that both the network compute subsystem 202 and the server compute subsystem 204 may be functional and may provide a steering configuration to the I/O steering engine 112 for steering an appropriate number of I/O resources in the I/O subsystem 114 to the network compute subsystem 202 and an appropriate number of I/O resources in the I/O subsystem 114 to the server compute subsystem 204. In some instances, the management compute subsystem 206 may determine that the server compute subsystem 204 may not be functional and may provide a steering configuration to the I/O steering engine 112 for steering at least one of the plurality of I/O resources from the I/O subsystem 114 to the network compute subsystem 202. In some instances, the management compute subsystem 206 may determine that the network compute subsystem 202 may not be functional and may provide a steering configuration to the I/O steering engine 112 for steering at least one of the plurality of I/O resources from the I/O subsystem 114 to the server compute subsystem 204. The configuration of the SoC 102 may be based on a policy, provided by an external entity (e.g., via a network connection), based on a hardware configuration (e.g., one or more pins or fuses) or based on a software configuration (e.g., data fields of a software register). In some embodiments, the SoC 102 may have a default configuration at power up. In some embodiments, the management compute subsystem 206 may determine a steering configuration to steer different I/O resources to different compute subsystems based on the configuration of the SoC. In some embodiments, the management compute subsystem 206 may determine a steering configuration to steer an asymmetric number of I/O resources to each compute subsystem, e.g., when the SoC is configured to provide compute services using asymmetric compute resources by each compute subsystem. In some embodiments, the management compute subsystem 206 may dynamically update the steering configuration, e.g., based on the utilization of compute resources by each compute subsystem at run-time.

Figure 3:
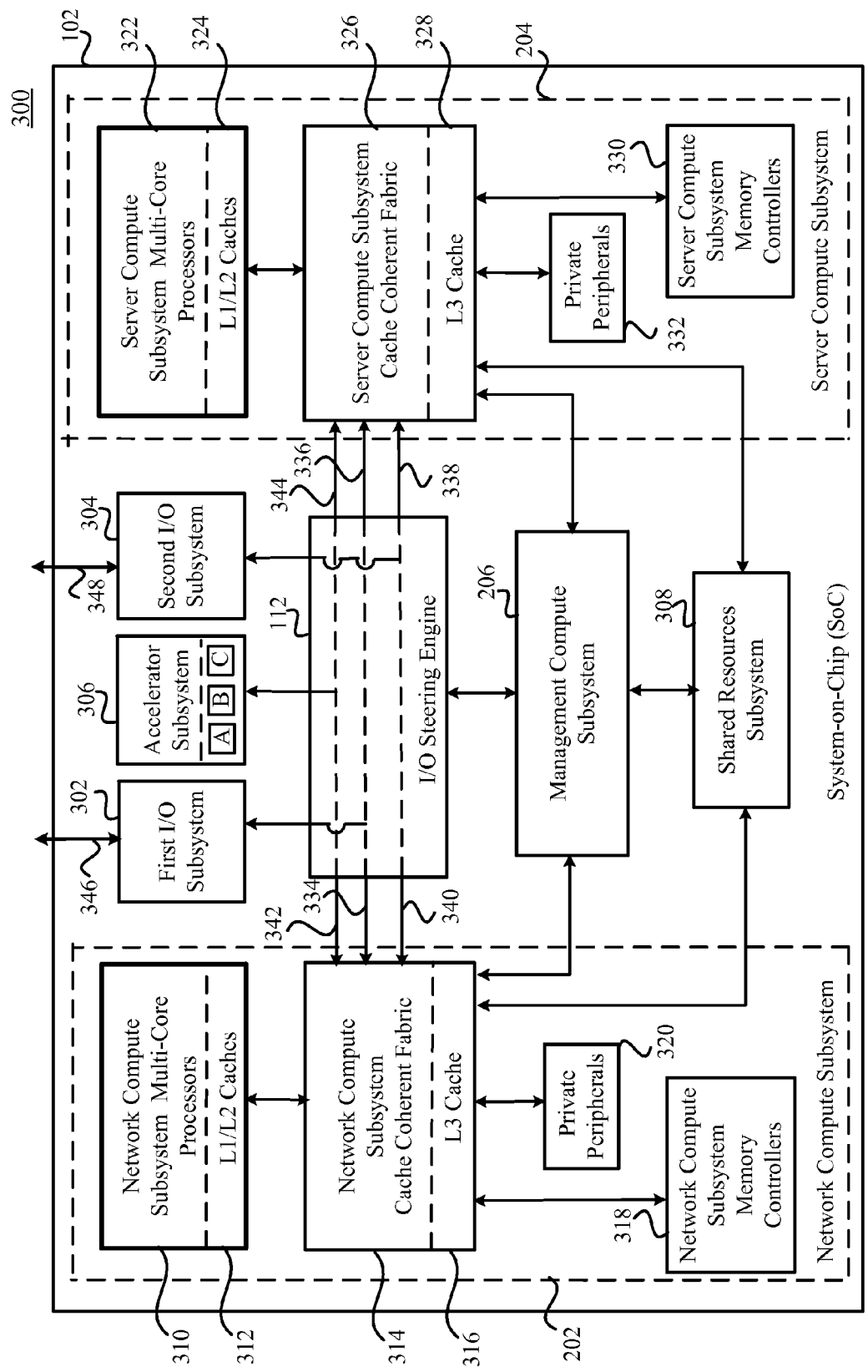
FIG. 3 illustrates a high level block diagram of a system-on-chip (SoC) according to certain embodiments of the technology.

FIG. 3 illustrates a system 300 with a detailed diagram of the SoC 102 according to some embodiments of the disclosed technology.

The SoC 102 may include the network compute subsystem 202, server compute subsystem 204, a first I/O subsystem 302, a second I/O subsystem 304, an accelerator subsystem 306, the I/O steering engine 112, the management compute subsystem 206 and a shared resources subsystem 308. It will be understood that for the purpose of simplicity, FIG. 3 illustrates two I/O subsystems that are steered to two compute subsystems. However, in some implementations, a plurality of I/O resources from more than two I/O subsystems may be steered among multiple compute subsystems (e.g., more than two) on a SoC without deviating from the scope of the disclosed technology.

The network compute subsystem 202 may include network compute subsystem multi-core processors 310, L1/L2 caches 312, a network compute subsystem cache coherent fabric 314, an L3 cache 316, private peripherals 320 and network compute subsystem memory controllers 318.

The server compute subsystem 204 may include server compute subsystem multi-core processors 322, L1/L2 caches 324, a server compute subsystem cache coherent fabric 326, an L3 cache 328 and network compute subsystem memory controllers 330.

The network compute subsystem multi-core processors 310 may include a plurality of multiple processor cores or processing units within the same processor. For example, in one instance, the network compute subsystem multi-core processors 310 may include twelve, 2-core processors. The network compute subsystem multi-core processors 310 may be configured to execute a plurality of instructions collectively on one or more processors of the processor cores. The instructions may be stored on a computer-readable storage medium, for example, in the form of a computer program. The computer-readable storage medium may be non-transitory. In some embodiments, the multi-core processors may share certain resources, such as busses and Level 1 (L1) caches and/or Level 2 (L2) caches between multiple-cores. For example, in some instances, each core in a single or multi-core processor may also include multiple executing logical processors (or threads). In such a core (that supports multiple logical processors), several stages of the execution pipeline and also lower level caches (e.g., L1 or L2) may also be shared. Some of the non-limiting examples of the multi-core processors may include ARM's cortex A57, MIPS, AMD Phenom, Intel ATOM, etc.

In some embodiments, the L1/L2 caches 312 may be shared between multiple cores of the network compute subsystem multi-core processors 310. For example, L1 cache may be used as a primary cache and L2 cache may be used as a secondary cache. In some embodiments, the L1/L2 caches 312 may be built into the network compute subsystem multi-core processors 310. For example, one L1/L2 cache may be integrated with one multi-core processor.

The network compute subsystem memory controllers 318 may include a plurality of memory controllers such as DDR (Double Data Rate) controllers, DDR2 controllers or any suitable memory controller. The network compute subsystem memory controllers 318 may be used to manage the access to an external memory (e.g., system memory). For example, the external system memory may include DDR synchronous dynamic random-access memory (DRAM), DDR2 DRAM, DRAM, etc. In some embodiments, the number of memory controllers in the network compute subsystem memory controllers 318 may be based on the number of processor cores, size of caches, etc.

The private peripherals 320 may include one or more peripheral devices dedicated to the network compute subsystem 202 that may not be shared by the server compute subsystem 204. For example, in some embodiments, the private peripherals 320 may include trusted peripherals such as a boot ROM.

The L3 cache 316 may include last level caches. In some embodiments, the L3 cache 316 may be shared by multiple cores of the network compute subsystem multi-core processors 310. In this specification, terms last level caches and L3 caches may be used interchangeably, however, in some systems the last level cache may be a Level 2 cache or a Level 4 cache or any other level without deviating from the scope of the technology.

The network compute subsystem cache coherent fabric 314 may represent a physical layer fabric that can connect to all the resources allocated to the network compute subsystem 202. In embodiments of the disclosed technologies, the network compute subsystem cache coherent fabric 314 may provide hardware security and performance/jitter isolation by allowing dedicated hardware paths for all the resources allocated to the network compute subsystem 202. In some embodiments, the network compute subsystem cache coherent fabric 314 may be configured to maintain coherency among different components of the network compute subsystem 202, for example, the network compute subsystem multi-core processors 310, L1/L2 caches 312, network compute subsystem memory controllers 318, L3 cache 316 and the shared resources subsystem 308. In some instances, the network compute subsystem cache coherent fabric 314 may represent the communication backbone of network compute subsystem 202. In some embodiments, the network compute subsystem cache coherent fabric 314 may be configured to ensure that all shared data is coherent in the network compute subsystem 202. For example, if certain shared data is stored in two or more locations (e.g., multiple processors, multiple cores of a processor, caches, etc.), the network compute subsystem cache coherent fabric 314 may be operable to maintain consistency of the shared data in different locations. In some embodiments, the network compute subsystem cache coherent fabric 314 may include a coherency controller and a coherency directory to maintain the coherency among different components of the network compute subsystem 202.

The server compute subsystem multi-core processors 322 may include a plurality of multiple processor cores or processing units within the same processor. For example, in one instance, the server compute subsystem multi-core processors 322 may include twelve, 2-core processors. The server compute subsystem multi-core processors 322 may be configured to execute a plurality of instructions collectively on one or more processors of the processor cores. The instructions may be stored on a computer-readable storage medium, for example, in the form of a computer program. The computer-readable storage medium may be non-transitory.

In some embodiments, the L1/L2 caches 324 may be shared between multiple cores of the server compute subsystem multi-core processors 322. For example, L1 cache may be used as a primary cache and L2 cache may be used as a secondary cache. In some embodiments, the L1/L2 caches 324 may be built into the server compute subsystem multi-core processors 322.

The server compute subsystem memory controllers 330 may include a plurality of memory controllers such as DDR controllers, DDR2 controllers or any suitable memory controller. The server compute subsystem memory controllers 330 may be used to manage the access to the external memory. In some embodiments, the number of memory controllers in the server compute subsystem memory controllers 330 may be based on the number of processor cores, size of caches, etc.

The private peripherals 332 may include one or more peripheral devices dedicated to the server compute subsystem 204 that may not be shared by the network compute subsystem 202. For example, in some embodiments, the private peripherals 332 may include trusted peripherals such as a boot ROM.

The L3 cache 328 may include last level caches. In some embodiments, the L3 cache 328 may be shared by multiple cores of the server compute subsystem multi-core processors 322.

The server compute subsystem cache coherent fabric 326 may represent a physical layer fabric that can connect to all the resources allocated to the server compute subsystem 204. In embodiments of the disclosed technologies, the server compute subsystem cache coherent fabric 326 may provide hardware security and performance/jitter isolation by allowing dedicated hardware paths for all the resources allocated to the server compute subsystem 204. In some embodiments, the server compute subsystem cache coherent fabric 326 may be configured to maintain coherency among different components of the server compute subsystem 204, for example, the server compute subsystem multi-core processors 322, L1/L2 caches 324, server compute subsystem memory controllers 330, L3 cache 328 and the shared resources subsystem 308. In some instances, the server compute subsystem cache coherent fabric 326 may represent the communication backbone of server compute subsystem 204. In some embodiments, the server compute subsystem cache coherent fabric 326 may be configured to ensure that all shared data is coherent in the server compute subsystem 204. For example, if certain shared data is stored in two or more locations (e.g., multiple processors, multiple cores of a processor, caches, etc.), the server compute subsystem cache coherent fabric 326 may be operable to maintain consistency of the shared data in different locations. In some embodiments, the server compute subsystem cache coherent fabric 326 may include a coherency controller and a coherency directory to maintain the coherency among different components of the server compute subsystem 204.

The first I/O subsystem 302 may include a plurality of first I/O resources. For example, the first I/O subsystem 302 may include one or more I/O devices and interfaces for internal and external communication. In some embodiments, the first I/O subsystem 302 may also include one or more SATA controllers, Ethernet MACs, PCIe devices, SERDES (Serialize-De-serialize) I/O multiplexers, UARTs, I2C, GPIOs and any other suitable I/O device for SoC functionality. In some embodiments, the first I/O subsystem 302 may include a first interface 346 to communicate with the host system 104, e.g., similar to the interface 116. The first I/O subsystem 302 may include a second interface 334 to communicate with the network compute subsystem 202, a third interface 336 to communicate with the server compute subsystem 204 and a fourth interface to communicate with the network (not shown). The interfaces 346, 334 and 336 may be based on a predefined interface such as a PCIe interface. In some embodiments, the fourth interface may be based on a standard such as Ethernet, token ring, Wi-Fi, ATM (Asynchronous Transfer Mode), etc. In some embodiments, the first I/O subsystem 302 may also include an interface (e.g., SATA) to connect to external mass storage devices such as hard drives, optical drives, etc.

The second I/O subsystem 304 may include a plurality of second I/O resources. For example, the second I/O subsystem 304 may include one or more I/O devices and interfaces for internal and external communication. In some embodiments, the second I/O subsystem 302 may also include one or more SATA controllers, Ethernet MACs, PCIe devices, SERDES (Serialize-De-serialize) I/O multiplexers, UARTs, I2C, GPIOs and any other suitable I/O device for SoC functionality. In some embodiments, the second I/O subsystem 304 may include a first interface 348 to communicate with the host system 104, e.g., similar to the interface 116. The second I/O subsystem 304 may include a second interface 338 to communicate with the server compute subsystem 204, a third interface 340 to communicate with the network compute subsystem 202 and a fourth interface to communicate with the network (not shown). The interfaces 348, 338 and 340 may be based on a predefined interface such as a PCIe interface. In some embodiments, the fourth interface may be based on a standard such as Ethernet, token ring, Wi-Fi, ATM (Asynchronous Transfer Mode), etc. In some embodiments, the fourth interface may be based on a standard such as Ethernet, token ring, Wi-Fi, ATM (Asynchronous Transfer Mode), etc. In some embodiments, the second I/O subsystem 304 may also include an interface (e.g., SATA) to connect to external mass storage devices such as hard drives, optical drives, etc.

In some embodiments, one or more first I/O resources in the first I/O subsystem 302 may be different than the second I/O resources in the second I/O subsystem 304. For example, in some instances, the first I/O subsystem 302 may include Ethernet MACs, I2C, UARTs and the second I/O subsystem 304 may include SATA controllers, GPIO, PCIe devices, etc. In some embodiments, the management compute subsystem 206 may determine a steering configuration to steer the appropriate I/O resources from each I/O subsystem based on the available resources and the I/O resources requirement for each compute subsystem.

The accelerator subsystem 306 may include one or more accelerators such as network accelerators, crypto engines, compression accelerators, etc. For example, in some instances, the crypto engines may execute cryptographic functions in hardware, thus reducing software overhead and accelerating the execution of decryption, encryption and authentication functions related to networking. In some embodiments, the accelerator subsystem 306 may include a combination of various hardware and software techniques to provide bandwidth optimization or network acceleration, for example, using hardware accelerators, various pipelines, caching, compression, etc. In some embodiments, the accelerator subsystem 306 may also support RDMA (Remote Direct Memory Access), etc. In some embodiments, the accelerator subsystem 306 may include a first interface 342 to communicate with the network compute subsystem 202 and a second interface 344 to communicate with the server compute subsystem 204.

According to some embodiments of the disclosed technology, one or more accelerators may be steered to the network compute subsystem 202 and one or more accelerators may be steered to the server compute subsystem 204. Note that in some implementations, one or more accelerators may be steered to multiple compute subsystems (e.g., more than two) without deviating from the scope of the disclosed technology. In some instances, the accelerator subsystem 306 may include an accelerator A, an accelerator B and an accelerator C as shown in FIG. 3. For example, the accelerator A may be a network accelerator, the accelerator B may be a crypto engine and the accelerator C may be a compression accelerator. Note that, in some embodiments, the accelerator subsystem 306 may include a plurality of network accelerators, crypto engines and other accelerators that may be steered to either compute subsystem appropriately. In one embodiment, accelerators A and B may be steered to the network compute subsystem 202 and the accelerator C may be steered to the server compute subsystem 204, for example, when both network compute subsystem 202 and the server compute subsystem 204 are functional. In another embodiment, some or all of the accelerators A, B and C may be steered to the network compute subsystem 202, for example, when the server compute subsystem 204 is de-configured or non-functional. In another embodiment, some or all of the accelerators A, B and C may be steered to the server compute subsystem 204, for example, when the network compute subsystem 202 is de-configured or non-functional.

The I/O steering engine 112 may be configured to steer at least one I/O resource in the first I/O subsystem 302 to the network compute subsystem 202 or to the server compute subsystem 204 and at least one I/O resource in the second I/O subsystem 304 to the network compute subsystem 202 or to the server compute subsystem 204. For example, in certain embodiments, the I/O steering engine 112 may steer the first I/O resources to the network compute subsystem cache coherent fabric 314 via the interface 334 or to the server compute subsystem cache coherent fabric 326 via the interface 336. In some embodiments, the I/O steering engine 112 may steer the second I/O resources to the network compute subsystem cache coherent fabric 314 via the interface 340 or to the server compute subsystem cache coherent fabric 326 via the interface 338. In some embodiments, the I/O steering engine 112 may also be configured to steer one or more accelerators in the accelerator subsystem 306 to the network compute subsystem 202 or to the server compute subsystem 204. For example, the I/O steering engine 112 may steer one or more accelerators to the network compute subsystem cache coherent fabric 314 via the interface 342 or to the server compute subsystem cache coherent fabric 326 via the interface 344. In some embodiments, the I/O steering engine 112 may steer different I/O resources to different compute subsystems based on the steering configuration. For example, in some instances, the I/O steering engine 112 may steer all the Ethernet MACs from the first I/O subsystem 302 to the network compute subsystem 202 and may steer all the GPIOs from the second I/O subsystem 304 to the server compute subsystem 204. In some embodiments, the I/O steering engine 112 may steer an asymmetric number of I/O resources from the first I/O subsystem 302 and the second I/O subsystem 304. For example, the I/O steering engine 112 may steer more number of Ethernet MACs from the first I/O subsystem 302 than the second I/O subsystem 304 and may steer more number of UARTs from the second I/O subsystem 304 than the first I/O subsystem 302.

The shared resources subsystem 308 may include one or more resources that can be shared between the network compute subsystem 202 and the server compute subsystem 204. In some embodiments, the shared resources subsystem 308 may include one or more peripherals that can be safely shared between the network compute subsystem 202 and the server compute subsystem 204 without causing any jitter or safety concerns. For example, the shared resources subsystem 308 may include a random number generator, a communication mailbox, scratchpad memory, flash memory, etc.

The management compute subsystem 206 may be configured to provide a steering configuration to the I/O steering engine 112 for steering the appropriate number of I/O resources to each compute subsystem. In some embodiments, the management compute subsystem 206 may also provide a steering configuration to the I/O steering engine 112 for steering one or more accelerators in the accelerator subsystem 306 to the network compute subsystem 202 or to the server compute subsystem 204. In some embodiments, the management compute subsystem 206 may determine that both the network compute subsystem 202 and the server compute subsystem 204 may be functional and may provide a steering configuration to the I/O steering engine 112 for steering the first I/O subsystem 302 to the network compute subsystem 202 and the second I/O subsystem 304 to the server compute subsystem 204. In certain embodiments, the management compute subsystem 206 may determine that the server compute subsystem 204 may not be functional and may provide a steering configuration to the I/O steering engine 112 for steering both the first I/O subsystem 302 and the second I/O subsystem 304 to the network compute subsystem 202. In certain embodiments, the management compute subsystem 206 may determine that the network compute subsystem 202 may not be functional and may provide a steering configuration to the I/O steering engine 112 for steering both the first I/O subsystem 302 and the second I/O subsystem 304 to the server compute subsystem 204. In some embodiments, steering configuration of the first I/O subsystem 302 and the second I/O subsystem 304 may be based on a default configuration, e.g., based on a policy. In some embodiments, the management compute subsystem 206 may determine the steering configuration of the first I/O subsystem 302 and the second I/O subsystem 304 at power-up based on hardware configuration (e.g., one or more pins or fuses) or software configuration (e.g., data field of a software register). In some embodiments, the management compute subsystem 206 may determine the steering configuration of the first I/O subsystem 302 and the second I/O subsystem 304 dynamically at run-time.

Figure 4A:
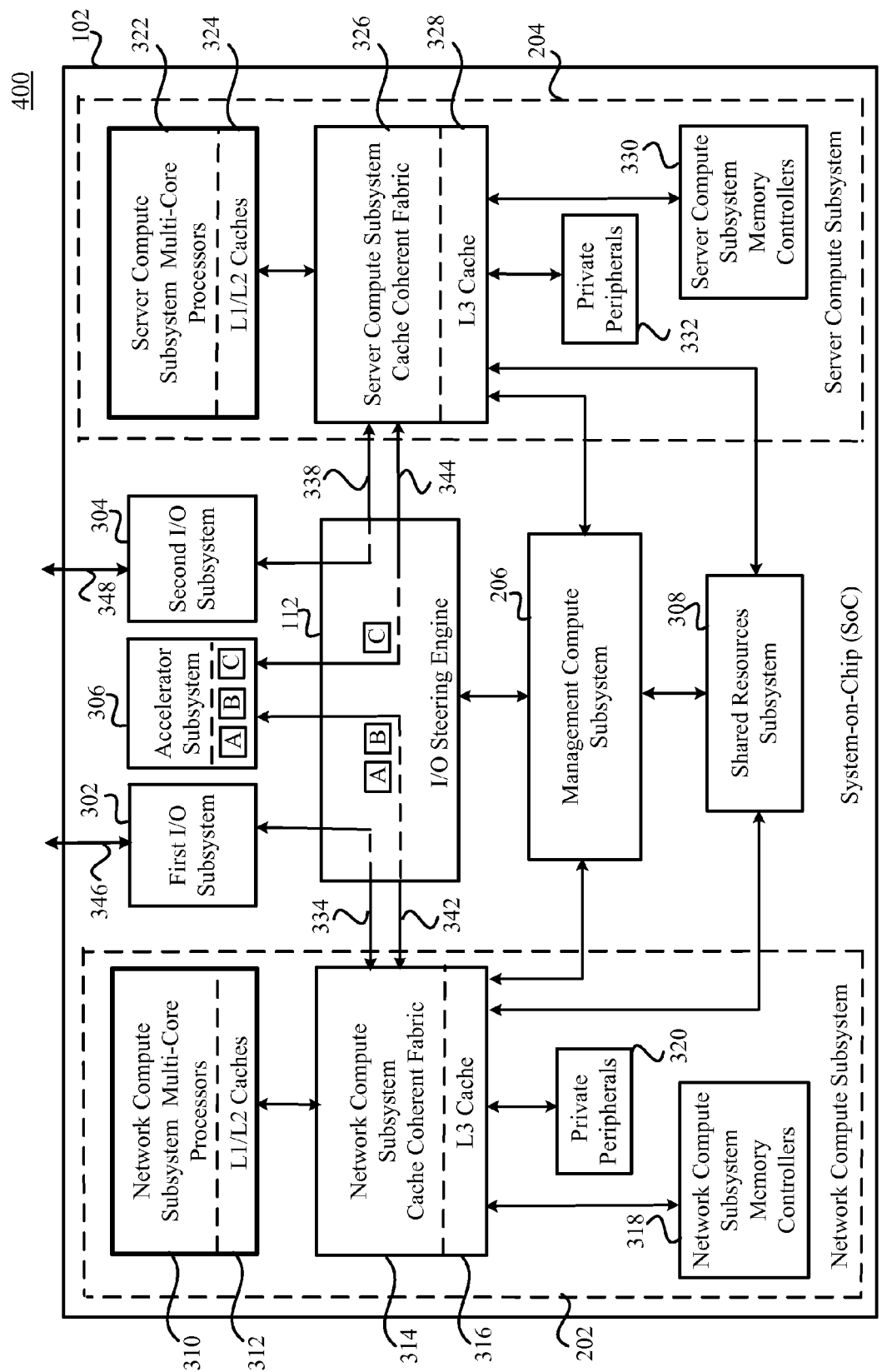
FIG. 4A illustrates an exemplary system including the SoC configured to include steering of the accelerators to both of the compute subsystems according to certain embodiments of the technology.
Figure 4B:
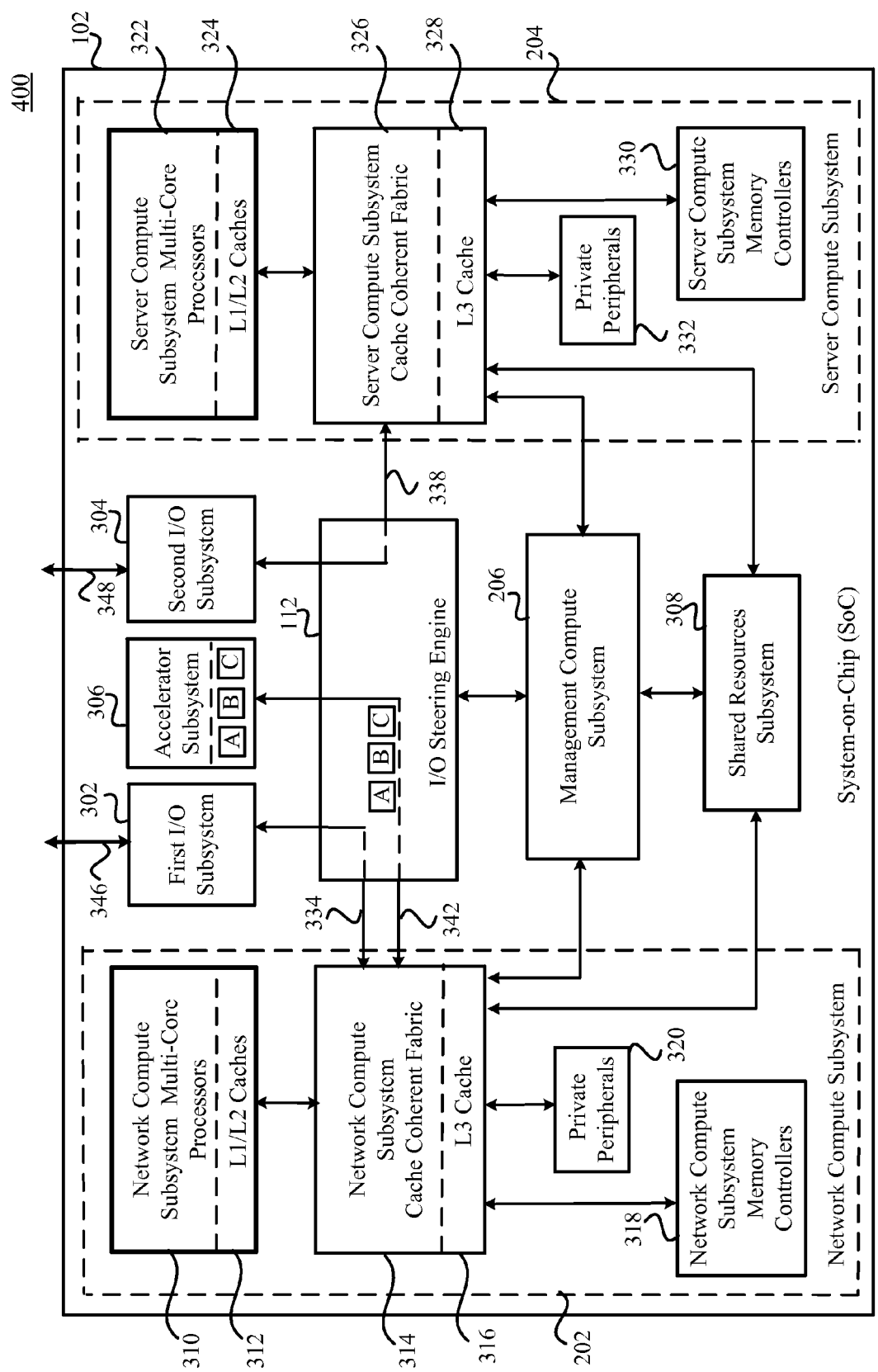
FIG. 4B illustrates an exemplary system including the SoC configured to include steering of the accelerators to only the network compute subsystem according to certain embodiments of the technology.
Figure 4C:
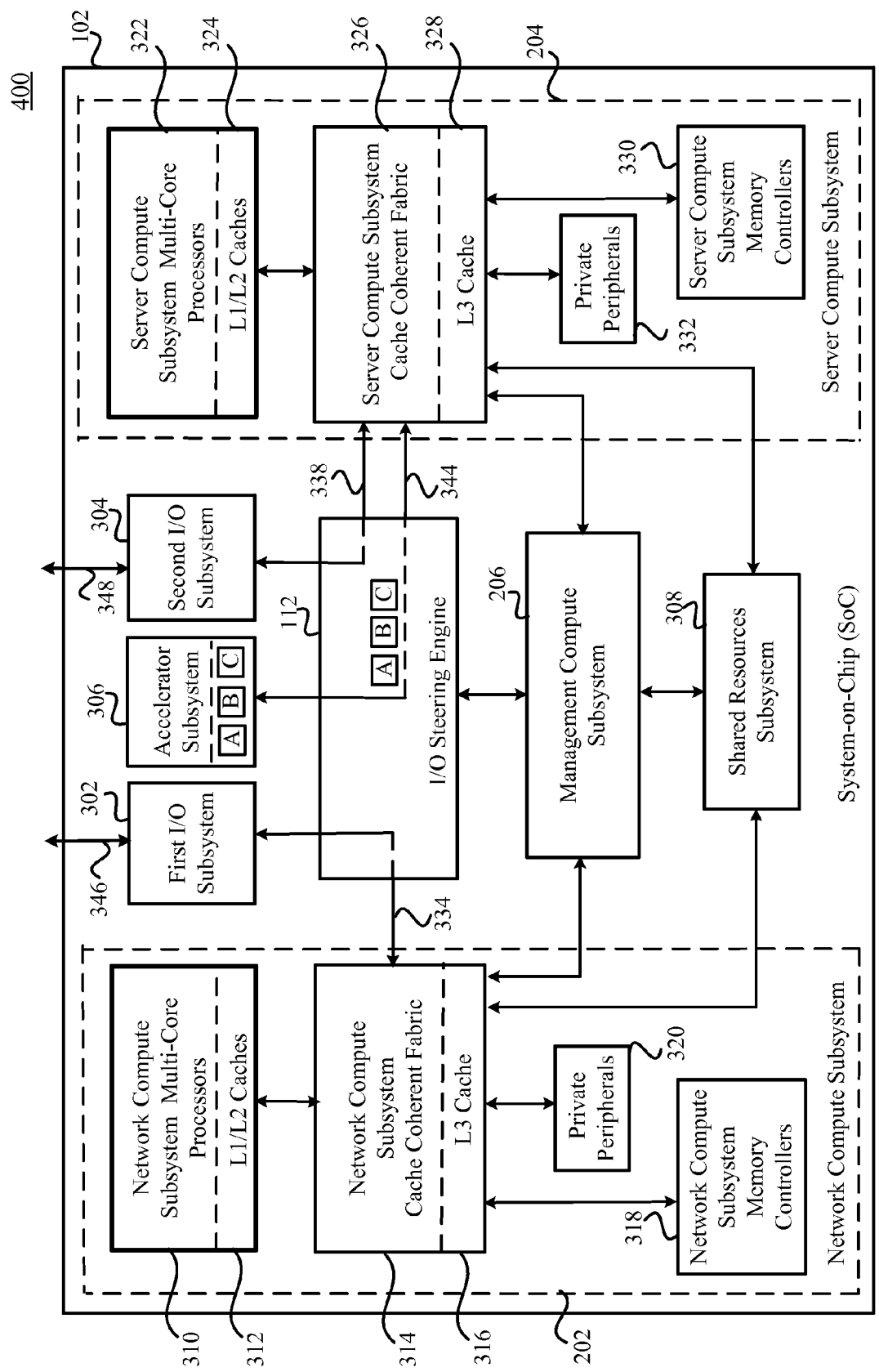
FIG. 4C illustrates an exemplary system including the SoC configured to include steering of the accelerators to only the server compute subsystem according to certain embodiments of the technology.

FIGS. 4A-4C illustrate an exemplary system 400 with the SoC 102 configured to include both the compute subsystems.

The system 400 may include all the components of the SoC 102 as discussed with reference to FIG. 3. Generally speaking, the server compute subsystem 204 may be configured for providing compute services and the network compute subsystem 202 may be configured for at least managing network traffic for the host system 104 and the server compute subsystem 204. The accelerator subsystem 306 may include one or more accelerators (e.g., accelerators A, B and C) that can be steered to only the network compute subsystem 202, to only the server compute subsystem 204 or to both the network compute subsystem 202 and the server compute subsystem 204.

FIG. 4A illustrates one embodiment of the disclosed technology that includes steering of the I/O resources and the accelerators to both the network compute subsystem 202 and the server compute subsystem 204.

The management compute subsystem 206 may determine the configuration of the SoC 102 at power up or at run-time. For example, the management compute subsystem 206 may determine that both the network compute subsystem 202 and the server compute subsystem 204 are functional. In some embodiments, the management compute subsystem 206 may determine that the network compute subsystem 202 and the server compute subsystem 204 have symmetric or asymmetric configuration based on the allocation of processing and memory resources for each compute subsystem. For example, the SoC 102 may be configured to provide high performance networking services and low performance compute services, high performance compute services and low performance networking services, or may be configured to provide similar performances for both networking and compute services. Accordingly, in one implementation, the management compute subsystem 206 may determine a steering configuration for providing to the I/O steering engine 112 for steering the appropriate number of I/O resources to each compute subsystem.

In some embodiments, the management compute subsystem 206 may also provide a steering configuration for steering one or more accelerators to the network compute subsystem 202 and to the server compute subsystem 204. For example, in some instances, the accelerators A and B can be steered to the network compute subsystem 202 and the accelerator C can be steered to the server compute subsystem 204. For example, the accelerator A may be a network accelerator that may be used by the network compute subsystem 202 for networking acceleration and the accelerator B may be a crypto engine that may be used by the network compute subsystem 202 for accelerating the cryptographic functions executed by the network compute subsystem 202. The accelerator C may be a compression accelerator for accelerating video compression or other data processing tasks performed by the server compute subsystem 204. In some embodiments, the management compute subsystem 206 may update the steering configuration at run-time for the I/O steering engine 112 to dynamically change the steering of number of I/O resources and/or accelerators to each compute subsystem.

In some embodiments, the network compute subsystem 202 may have more compute resources allocated as compared to server compute subsystem 204, for example, the SoC 102 may be configured to provide high performance networking services and low performance compute services. In some embodiments, configuration setting for the SoC 102 may be provided at boot-time or stored in persistent memory (not shown). For example, the management compute subsystem 206 may determine the configuration settings for the SoC 102 based on hardware configuration (e.g., one or more pins or fuses) or software configuration (e.g., data fields of a register). In some embodiments, configuration setting for the SoC 102 may be dynamically updated at run-time. For example, the SoC 102 may be configured at boot-time or dynamically to include only the network compute subsystem 202, only the server compute subsystem 204 or both network compute subsystem 202 and the server compute subsystem 204. For example, in some instances, the network compute subsystem multi-core processors 310 may include more number of processor cores than the server compute subsystem multi-core processors 322, more number of network compute subsystem memory controllers 318 than the server compute subsystem memory controllers 330 or may include bigger L1/L2 caches 312, L3 cache 316 than the L1/L2 caches 324, L3 cache 328. Thus, the I/O steering engine 112 may steer more number of I/O resources to the network compute subsystem 202 (e.g., via the interface 334) than the server compute subsystem 204 (e.g., via the interface 338) to match the throughput requirement of the compute resources allocated to the network compute subsystem 202. Similarly, for a high performance networking configuration, the I/O steering engine 112 may steer more number of network accelerators to the network compute subsystem 202 (e.g., via the interface 342) as compared to the server compute subsystem 204 to match up the networking bandwidth. For example, only the crypto engines may be steered to the server compute subsystem 204 (e.g., via the interface 344). In some embodiments, the I/O steering engine 112 may include multiplexers, de-multiplexers or any other suitable logic to perform the steering.

FIG. 4B illustrates one embodiment of the disclosed technology that includes steering of the accelerators to only the network compute subsystem 202.

In one embodiment, one or more accelerators in the accelerator subsystem 306 may be steered to the network compute subsystem 202 only (e.g., via the interface 342). For example, in some embodiments, the network compute subsystem 202 may be configured to provide high performance networking services and the server compute subsystem 204 may be configured to provide low performance compute services. In some instances, the network compute subsystem 202 may utilize a plurality of network accelerators, crypto engines, compression accelerators and any other suitable accelerators to provide high performance networking services and the server compute subsystem 204 may not utilize any accelerators. Note that FIG. 4B shows steering of accelerators A, B and C to the network compute subsystem 202. However, any suitable number of accelerators may be steered to the network compute subsystem 202, e.g., only A, only B, only C or multiple instances of A, B and/or C.

FIG. 4C illustrates one embodiment of the disclosed technology that includes steering of the accelerators to only the server compute subsystem 204.

In one embodiment, one or more accelerators in the accelerator subsystem 306 may be steered to the server compute subsystem 204 only (e.g., via the interface 344). For example, in some embodiments, the server compute subsystem 204 may be configured to provide high performance compute services and the network compute subsystem 204 may be configured to provide low performance networking services. In some instances, the server compute subsystem 204 may utilize a plurality of crypto engines, compression accelerators and any other suitable accelerators to provide high performance compute services and the network compute subsystem 202 may not utilize any accelerators. Note that FIG. 4C shows steering of accelerators A, B and C to the server compute subsystem 204. However, any suitable number of accelerators may be steered to the server compute subsystem 204, e.g., only B, only C or multiple instances of B and/or C.

Figure 5:
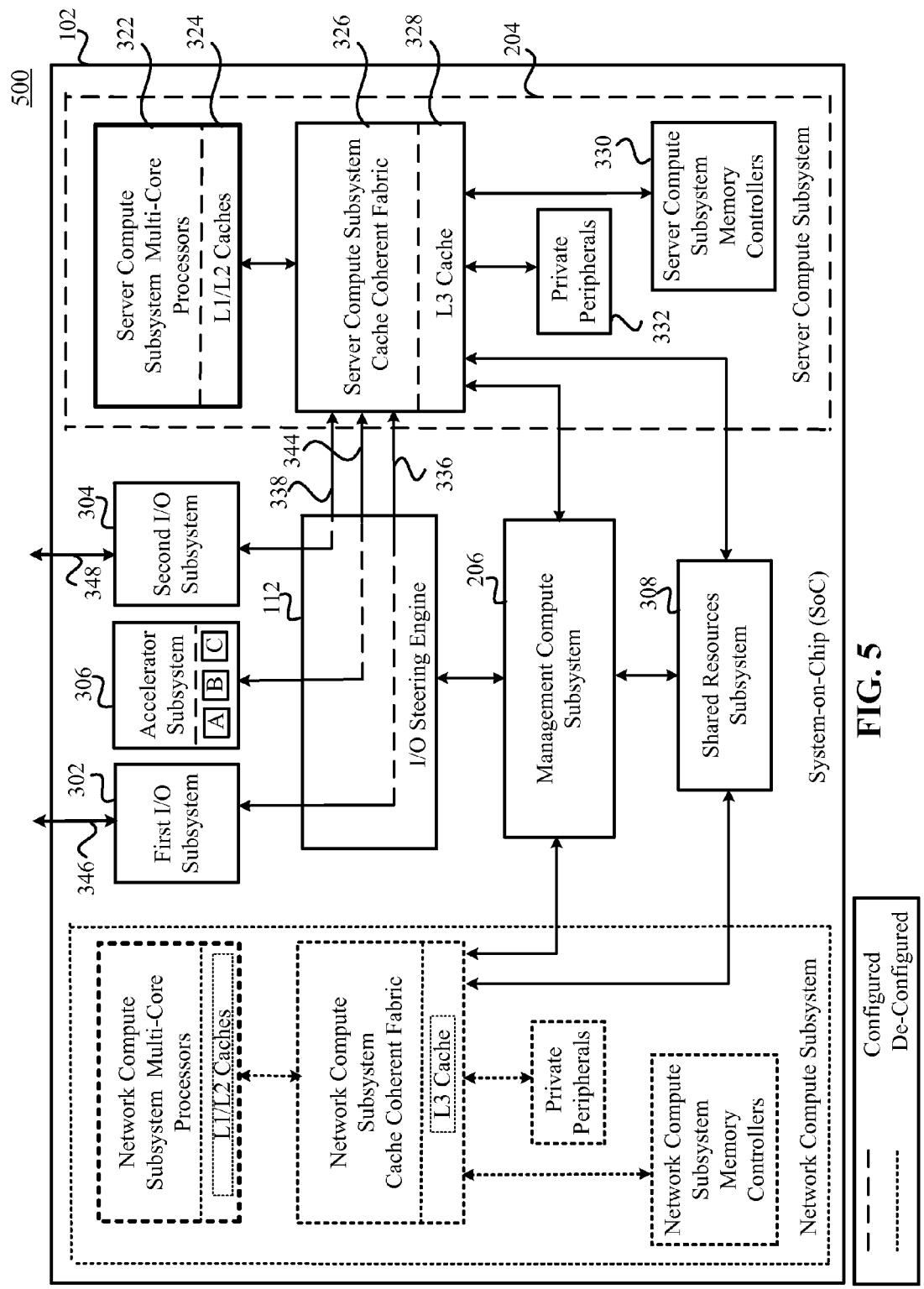
FIG. 5 illustrates an exemplary system with the SoC configured to include only server compute subsystem according to certain embodiments of the technology.

FIG. 5 illustrates an exemplary system 500 with the SoC 102 configured to include only server compute subsystem.

As illustrated in FIG. 5, the network compute subsystem 202 may not be functional. For example, the SoC 102 may be configured to provide only server compute services. In some embodiments, the SoC 102 may only include the server compute subsystem 204 that may be configured for providing compute services.

The management compute subsystem 206 may determine the configuration of the SoC 102 at power up or dynamically at run-time. For example, the management compute subsystem 206 may determine that only the server compute subsystem 204 is functional. In some embodiments, the network compute subsystem 202 may be de-configured or de-featured. For example, the SoC 102 may be configured to provide only high performance compute services, thus the networking services may not be utilized. For example, the SoC 102 may be configured to perform data computations or data analysis that may utilize compute intensive resources. In some embodiments, the management compute subsystem 206 may determine a steering configuration for providing to the I/O steering engine 112 based on the allocation of processing and memory resources for the server compute subsystem 204. Thus, the I/O steering engine 112 may steer one or more first I/O resources (e.g., via the interface 336) and one or more second I/O resources (e.g., via the interface 338) to the server compute subsystem 204 based on the steering configuration provided by the management compute subsystem 206. For example, in some instances, the I/O steering engine 112 may steer more number of Ethernet MACs from the first I/O subsystem 302 as compared to the second I/O subsystem 304 to the server compute subsystems 204 and more number of SATA controllers from the second I/O subsystem 304 than the first I/O subsystem 302 to the server compute subsystems 204. The I/O steering engine 112 may or may not steer the accelerators to the server compute subsystems 106 based on the steering configuration provided by the management compute subsystem 114. In some embodiments, one or more accelerators in the accelerator subsystem 306 may be steered to the server compute subsystems 204 (e.g., via the interface 344). For example, in some instances, only the crypto engines and/or compression accelerators may be steered to the server compute subsystems 204 but not the network accelerators.

Some embodiments of the disclosed technology can allow steering more number of resources to the server compute subsystem 204 when the network compute subsystem 202 is not functional. For example, the SoC 102 may be configured to provide high performance compute services. According to some embodiments, a plurality of I/O resources can be steered from both the first I/O subsystem 302 and the second I/O subsystem 304 to match the compute resources utilized by the server compute subsystem 204 to provide high performance compute services. Thus, embodiments of the technology can allow more efficient utilization of I/O resources to increase the throughput of the system.

Figure 6:
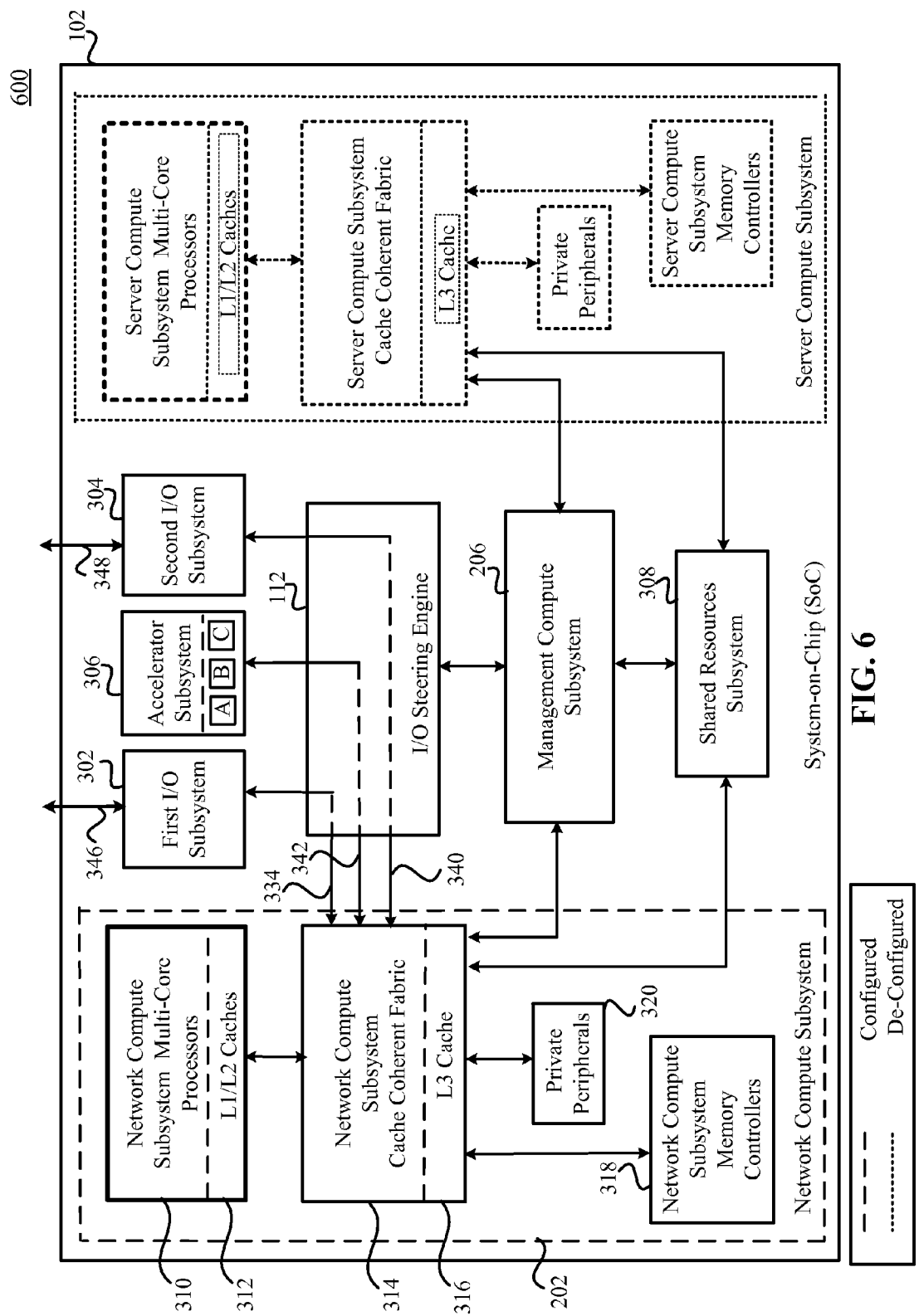
FIG. 6 illustrates an exemplary system with the SoC configured to include only a network compute subsystem according to certain embodiments of the technology.

FIG. 6 illustrates an exemplary system 600 with the SoC 102 configured to include only network compute subsystem 202.

As illustrated in FIG. 6, the server compute subsystem 204 may not be functional. For example, the SoC 102 may be configured to provide only networking services. In some embodiments, the SoC 102 may only include the network compute subsystem 202 that may be configured for at least managing network traffic for the host system 104.

The management compute subsystem 206 may determine the configuration of the SoC 102 at power up. For example, the management compute subsystem 206 may determine that only the network compute subsystem 202 is functional. In some embodiments, the server compute subsystem 204 may be de-configured or de-featured. For example, the SoC 102 may be configured to provide only high performance networking services, thus the compute services may not be utilized. For example, the SoC 102 may be configured to perform network storage or network traffic shaping that may utilize network intensive resources. In some embodiments, the management compute subsystem 206 may determine a steering configuration for providing to the I/O steering engine 112 based on the allocation of processing and memory resources for the network compute subsystem 202. Thus, the I/O steering engine 112 may steer one or more first I/O resources (e.g., via the interface 334) and one or more second I/O resources (e.g., via the interface 340) to the network compute subsystem 202 to match the throughput requirement of the network compute subsystem 202 to provide the networking services. In some embodiments, the I/O steering engine 112 may steer one or more accelerators in the accelerator subsystem 306 to the network compute subsystem 202 to meet the required network bandwidth for the networking services provided by the SoC 102 (e.g., via the interface 342). For example, in some instances, one or more network accelerators, crypto engines, compression accelerators, etc. may be steered to the network compute subsystem 202.

Some embodiments of the disclosed technology can allow steering more number of resources to the network compute subsystem 202 when the server compute subsystem 204 is not functional. For example, the SoC 102 may be configured to provide high performance networking services. According to some embodiments, a plurality of I/O resources can be steered from both the first I/O subsystem 302 and the second I/O subsystem 304 to match the compute resources utilized by the network compute subsystem 202 to provide high performance networking services. Further, a plurality of accelerators can be steered from the accelerator subsystem 306 to the network compute subsystem 202 to provide network acceleration. Thus, embodiments of the technology can allow more efficient utilization of I/O resources to increase the throughput of the system.

Figure 7:
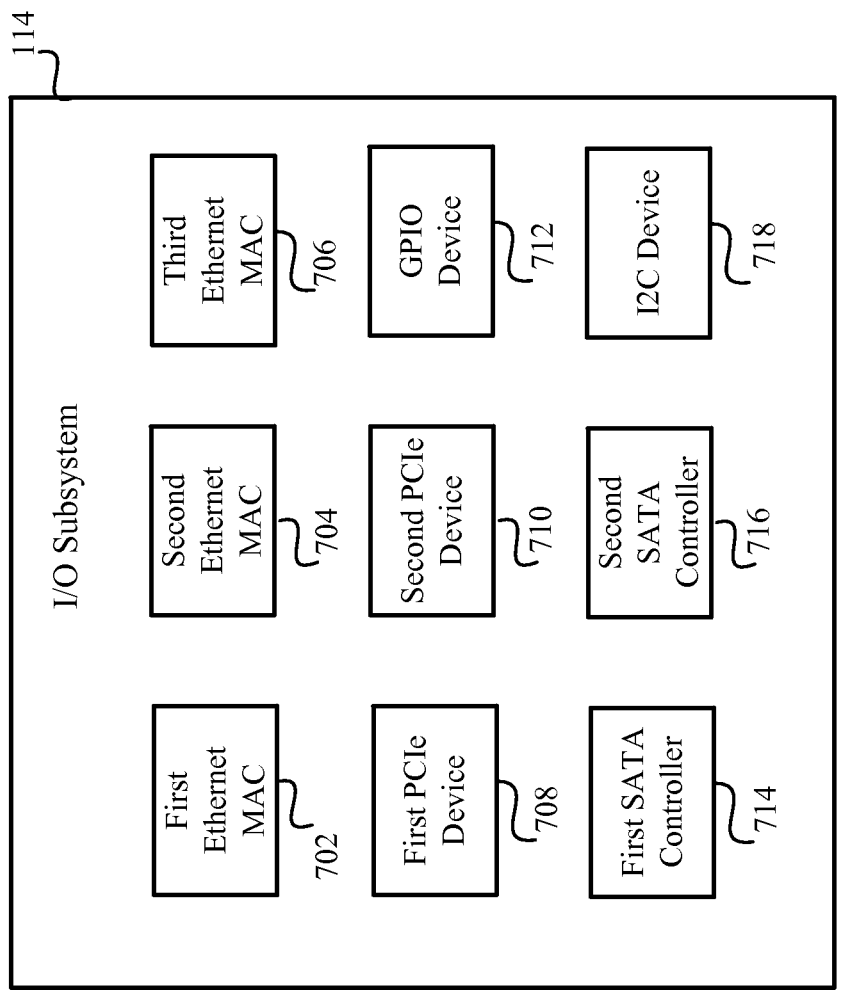
FIG. 7 illustrates a block diagram for an I/O subsystem, according to certain embodiments of the technology.

FIG. 7 illustrates a block diagram for the I/O subsystem 114, according to certain embodiments of the technology. The I/O subsystem 114 may include a plurality of I/O devices, for example, a first Ethernet MAC 702, a second Ethernet MAC 704, a third Ethernet MAC 706, a first PCIe device 708, a second PCIe device 710, a GPIO device 712, a first SATA controller 714, a second SATA controller 716 and an I2C device 718. It will be understood that the I/O subsystem 114 may include more or less number of devices based on the configuration of the SoC 102.

In some embodiments, the I/O subsystem 114 may include the first I/O subsystem 302 and the second I/O subsystem 304 as discussed previously with reference to FIG. 3. According to some embodiments of the disclosed technology, one or more devices in the I/O subsystem 114 may be steered to one or more compute subsystems as discussed previously with reference to FIG. 1. For example, in some implementations, one or more devices may be steered to the network compute subsystem 202 and one or more devices may be steered to the server compute subsystem 204. In some embodiments, the management compute subsystem 206 may provide a steering configuration to the I/O steering engine 112 to steer the appropriate number and type of I/O devices to one or more compute subsystems based on the configuration of the SoC 102. For example, in one embodiment, when the SoC 102 is configured to function as both the network compute subsystem 202 and the server compute subsystem 204 (e.g., see FIGS. 4A-4C) the I/O steering engine 112 may steer a first set of I/O devices to the network compute subsystem 202 and a second set of I/O devices to the server compute subsystem 204. For example, the first set of I/O devices may include an appropriate number and type of I/O devices that may be used by the network compute subsystem 202 such as the first Ethernet MAC 702, second Ethernet MAC 704, first PCIe device 708 and the first SATA controller 714. The second set of I/O devices may include an appropriate number and type of I/O devices that may be used by the server compute subsystem 204 such as the third Ethernet MAC 706, second PCIe device 710, GPIO device 712, second SATA controller 716 and the I2C device 718. In one embodiment, when the SoC 102 is configured as a server only compute subsystem (e.g., see FIG. 5) the I/O steering engine 112 may steer the appropriate I/O devices that may be used by the server compute subsystem 204, e.g., the third Ethernet MAC 706, first PCIe device 708, second SATA controller 716 and the GPIO device 712. In one embodiment, when the SoC 102 is configured as a network only compute subsystem (e.g., see FIG. 6) the I/O steering engine 112 may steer the appropriate I/O devices that may be used by the network compute subsystem 202, e.g., the first Ethernet MAC 702, second Ethernet MAC 704, first PCIe device 708 and the first SATA controller 714.

Figure 8:
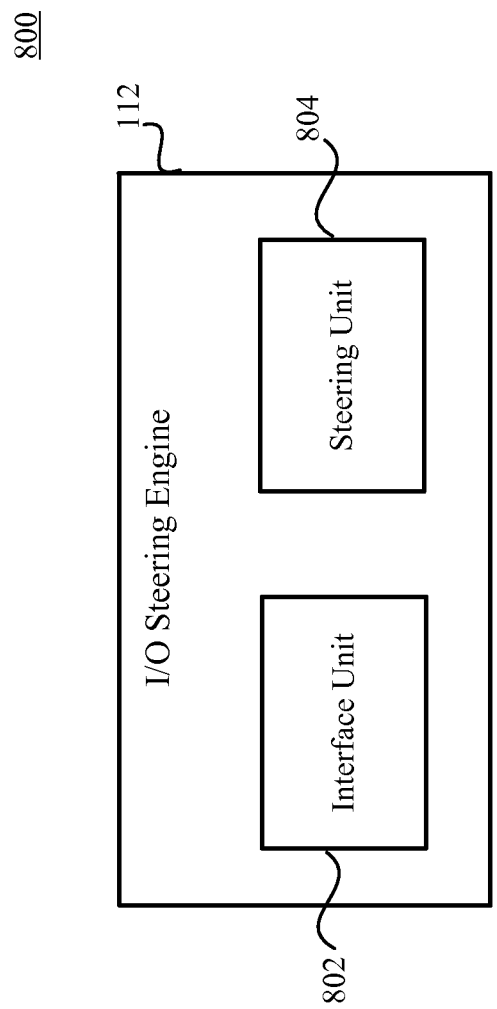
FIG. 8 illustrates a block diagram of an I/O steering engine according to certain embodiments of the technology.

FIG. 8 illustrates a block diagram for the I/O steering engine 112, according to certain embodiments of the technology. The I/O steering engine 112 may include an interface unit 802 and a steering unit 804. In certain embodiments of the technology, the I/O steering engine 112 may allow the plurality of I/O resources to connect to network compute subsystem 202 and the server compute subsystem 204 via the physical layers represented by the network compute subsystem cache coherent fabric 314 and the server compute subsystem cache coherent fabric 326.

The interface unit 802 may include various interfaces with different components of the SoC 102. For example, the interface unit 802 may interface with the first I/O subsystem 302, second I/O subsystem 304, accelerator subsystem 306, network compute subsystem cache coherent fabric 314, server compute subsystem cache coherent fabric 326 and the management compute subsystem 206.

The steering unit 804 may include steering logic for steering or directing one or more I/O resources in the I/O subsystem 114 and one or more accelerators in the accelerator subsystem 306 to one or more compute subsystems. For example, in some embodiments, the steering unit 804 may include steering logic for steering at least one of the plurality of first I/O resources in the first I/O subsystem 302 to the network compute subsystem cache coherent fabric 314 or to the server compute subsystem cache coherent fabric 326 and for steering at least one of the plurality of second I/O resources in the second I/O subsystem 304 to the network compute subsystem cache coherent fabric 314 or to the server compute subsystem cache coherent fabric 326. The steering unit 804 may also be configured to steer one or more accelerators in the accelerator subsystem 306 to the network compute subsystem 202 or to the server compute subsystem 204. In some embodiments, the steering logic may be implemented using a steering matrix, a cross bar, a mesh, multiplexers, de-multiplexers, etc. However, other implementations of the steering logic are possible. In some embodiments, the steering unit 804 may steer one or more I/O resources based on a steering configuration provided by the management compute subsystem 206.

Figure 9:
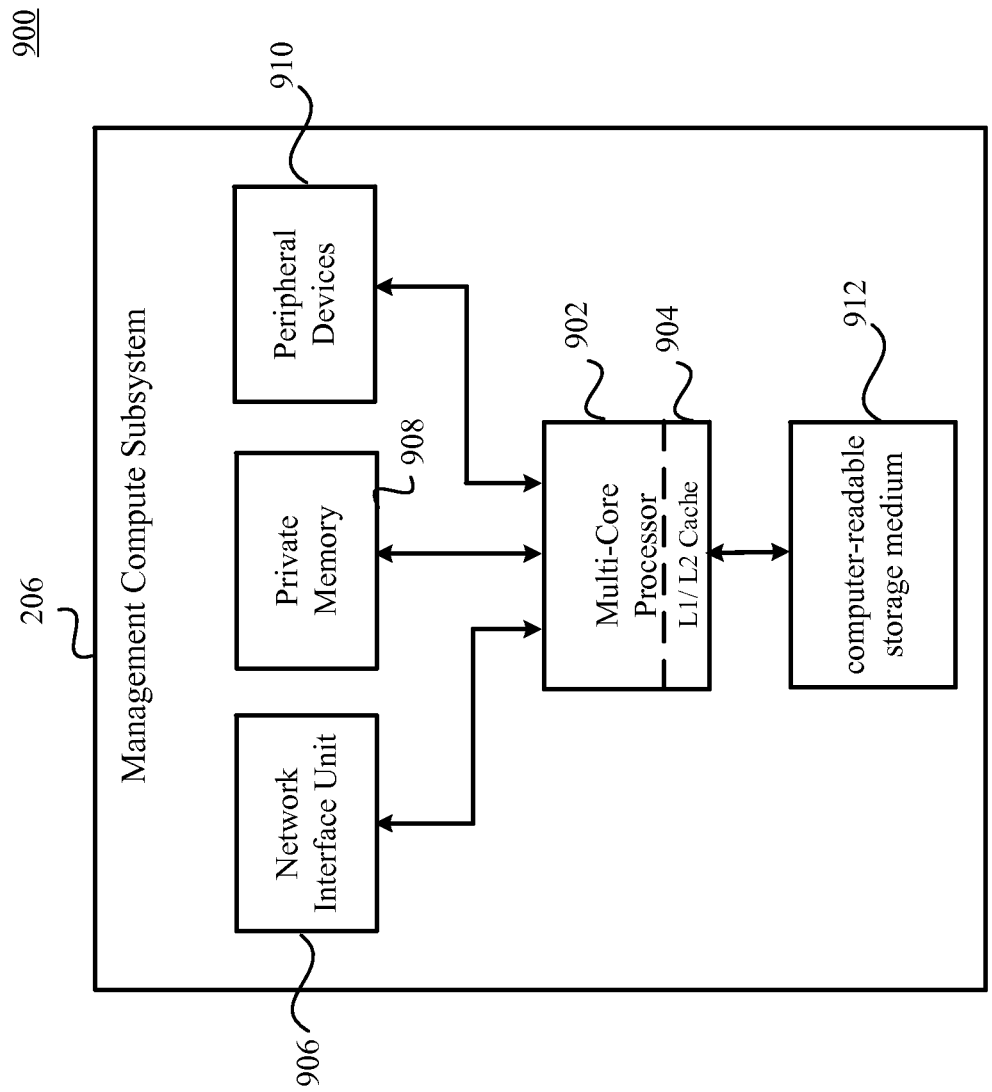
FIG. 9 illustrates a block diagram of the management compute subsystem according to certain embodiments of the technology.

FIG. 9 illustrates a block diagram for the management compute subsystem 206, according to certain embodiments of the disclosed technology. The management compute subsystem 206 may include a multi-core processor 902, an L1/L2 cache 904, a network interface unit 906, private memory 908, peripheral devices 910 and a computer-readable storage medium 912.

The multi-core processor 902 may include two or more processor cores such as A57 by ARM®. In some embodiments, a single core processor may be used in place of the multi-core processor 902. The L1/L2 cache 904 may be internal or external to the multi-core processor 902 and may be shared by all the processor cores. The multi-core processor 902 may be configured to execute a plurality of instructions that may be stored on the computer-readable storage medium 912. For example, the computer-readable medium may include instructions to determine a steering configuration to provide to the I/O steering engine 112 for steering the I/O resources and accelerators to the appropriate compute subsystem at boot-time or dynamically at run-time. The computer-readable storage medium 912 may be non-transitory. In some embodiments, the computer-readable storage media may include but are not limited to, parameter random access memory (PRAM), SRAM, DRAM, RAM, read only memory (ROM), electrically erasable programmable read-only memory (EEPROM), flash memory or other memory technology, compact disc (CD)-ROM, digital video disk (DVD) or other optical storage, magnetic cassettes, magnetic tape, magnetic disk storage or other magnetic storage devices, or any other medium which can be used to store the desired information and which can be accessed by multi-core processor 902. In some embodiments, the computer-readable storage medium 912 may be part of the peripheral devices 910. The L1/L2 cache 904 may be data cache for temporary storage of data.

The network interface unit 906 may allow the management compute subsystem 206 to connect to a network. For example, the network interface unit 906 may include an Ethernet MAC (Medium Access Control) that can enable the management compute subsystem 206 to connect to a network such as the Ethernet. In some instances, the Ethernet MAC may provide an Ethernet port to interface to a PHY (physical layer) device for connecting to a network. In some embodiments, the management compute subsystem 206 can communicate with an external entity or system over the network to determine the work load of a virtual server instance in order to configure the processing and memory resources.

The private memory 908 may include memory for private use of the management compute subsystem 206. The private memory 908 may include volatile memory such as random access memory (e.g., SRAM or DRAM). For example, the management compute subsystem 206 may use the private memory 908 for temporary storage of data.

The peripheral devices 910 may include private peripheral devices for the management compute subsystem 206. In some embodiments, some of the private peripheral devices 910 may include devices for reboot and power management of different subsystems of the SoC 102. For example, the peripheral devices 910 may include a trusted management module including boot firmware that can execute at power-on to establish a root-of-trust before powering on other subsystems. In some embodiments, power management may be provided through voltage manipulation, clock manipulation or any other suitable method.

In some embodiments, the management compute subsystem 206 may be configured to be the first to run upon a cold power on of the entire SoC 102. In some instances, the management compute subsystem 206 may be powered on first to establish a root-of-trust for the other subsystems before they are powered on. For example, the boot processes for the network compute subsystem 202 and the server compute subsystem 204 may be considered hierarchically under the core boot for the management compute subsystem 206. In some embodiments, the software that would subsequently run on the network compute subsystem 202 and the server compute subsystem 204 may have been authenticated by the management compute subsystem 206 as having been signed using a private key associated with the host system 104 or a particular service provided by the host system 104. This can allow both the network compute subsystem 202 and the server compute subsystem 204 processes to boot via trusted and independent boot loaders.

In some embodiments, the management compute subsystem 206 may be reset/rebooted with a separate reset line without affecting the live operation of both the network compute subsystem 202 and the server compute subsystem 204.

Figure 10:
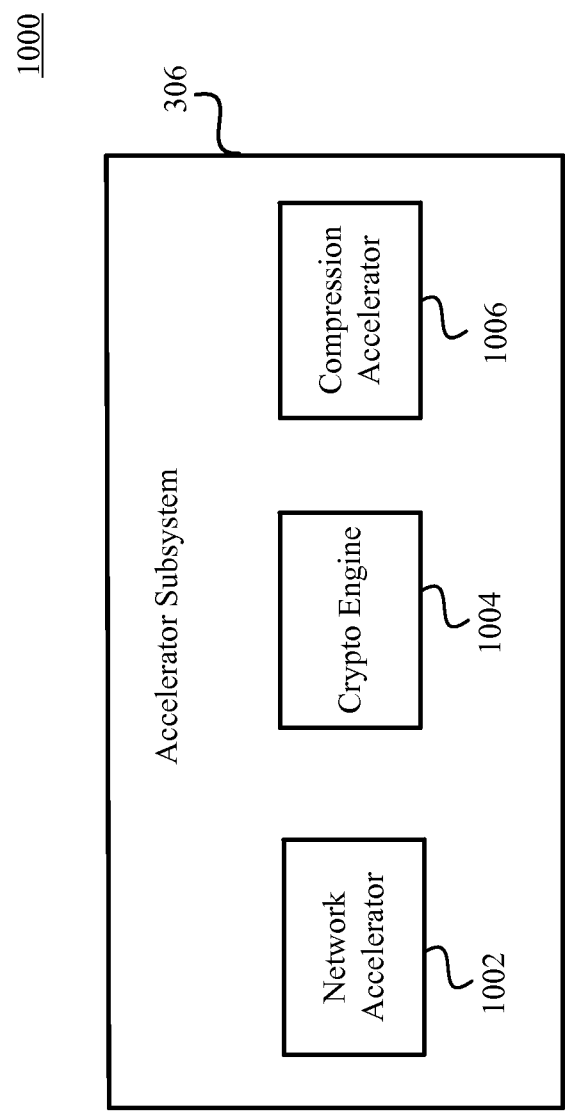
FIG. 10 illustrates a block diagram for an accelerator subsystem according to some embodiments of the disclosed technology.

FIG. 10 illustrates a block diagram for the accelerator subsystem 306 according to some embodiments of the disclosed technology. The accelerator subsystem 306 may include a plurality of accelerators such as a network accelerator 1002, a crypto engine 1004 and a compression accelerator 1006. It will be understood that the accelerator subsystem 306 may include more or fewer accelerators and various types of accelerators that can be steered to more than one compute subsystem in accordance with embodiments of the disclosed technology.

The network accelerator 1002 may be utilized to provide network acceleration. For example, in some implementations, the network accelerator 1002 may include a combination of hardware and software to provide bandwidth optimization, e.g., by using caching, data compression, data duplication or any other suitable technique. One or more network accelerator 1002 may be steered to the network compute subsystem 202 and/or to the server compute subsystem 204 based on the configuration of the SoC 102 as discussed with reference to FIGS. 4A-4C, 5 and 6.

The crypto engine 1004 may be utilized to provide hardware acceleration, e.g., for cryptographic functions. For example, in some implementations, the crypto engine 1004 may include a combination of hardware and software to provide hardware acceleration, e.g., by using caching, data compression, data duplication or any other suitable technique. One or more crypto engine 1004 may be steered to the network compute subsystem 202 and/or to the server compute subsystem 204 based on the configuration of the SoC 102 as discussed with reference to FIGS. 4A-4C, 5 and 6.

The compression accelerator 1006 may be utilized to provide acceleration for compute intensive applications. For example, in some implementations, the compression accelerator 1006 may include a combination of hardware and software to provide acceleration using any suitable technique. One or more compression accelerator 1006 may be steered to the network compute subsystem 202 and/or to the server compute subsystem 204 based on the configuration of the SoC 102 as discussed with reference to FIGS. 4A-4C, 5 and 6.

Figure 11:
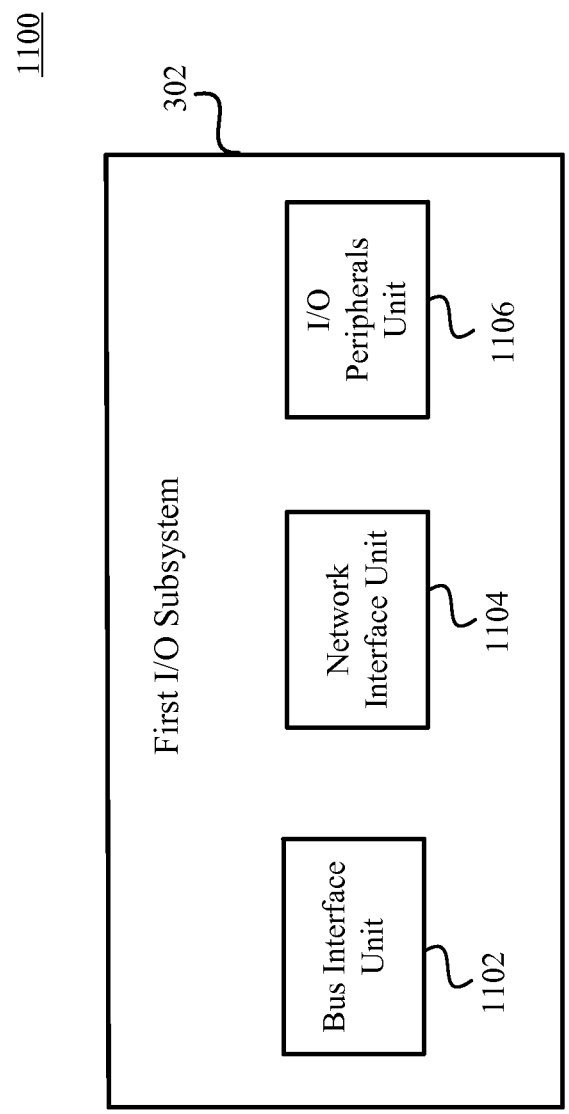
FIG. 11 illustrates a block diagram of a first I/O subsystem according to certain embodiments of the technology.

FIG. 11 illustrates some components of the first I/O subsystem 302. The first I/O subsystem 302 may include a bus interface unit 1102, a network interface unit 1104 and an I/O peripherals unit 1106. In some embodiments, the first I/O subsystem 302 may be part of the I/O subsystem 114 as discussed previously with reference to FIG. 7.

The bus interface unit 1102 may include one or more bus interfaces for communication with internal or external components. For example, the bus interface unit 1102 may include a first interface to communicate with the host system 104, e.g., interface 346. In some embodiments, the first interface may be a PCIe interface. For example, the bus interface unit 1102 may include one or more PCIe ports to connect to other PCIe ports. The bus interface unit 1102 may include a Root Complex (RC) port and an EndPoint port (EP). In some embodiments, the network compute subsystem 202 may communicate with the host system 104 via a PCIe port in the first I/O subsystem 302 and a PCIe port in the host system 104 using the interface 346. The bus interface unit 1102 may include a second interface to connect with the I/O steering engine 112 (e.g., to connect with the interface unit 802 with reference to FIG. 8). For example, the I/O steering engine 112 may connect the first I/O resources in the first I/O subsystem 302 to either the network compute subsystem 202 or to the server compute subsystem 204 using the second interface.

The network interface unit 1104 may include a third interface to connect to a network. In some embodiments, the network interface unit 1104 may include one or more Ethernet MACs (e.g., 10/25/40/50 Gb/sec) to connect to an Ethernet network. In some instances, the Ethernet MACs may provide Ethernet ports to interface to a PHY (physical layer) device for connecting to a network.

The I/O peripherals unit 1106 may include one or more peripheral devices. For example, the I/O peripherals unit 1106 may include one or more peripheral devices such as UARTs, I2C, GPIOs, SATA controllers, SPI ports, SERDES (Serialize-De-serialize) interface, etc.

Figure 12:
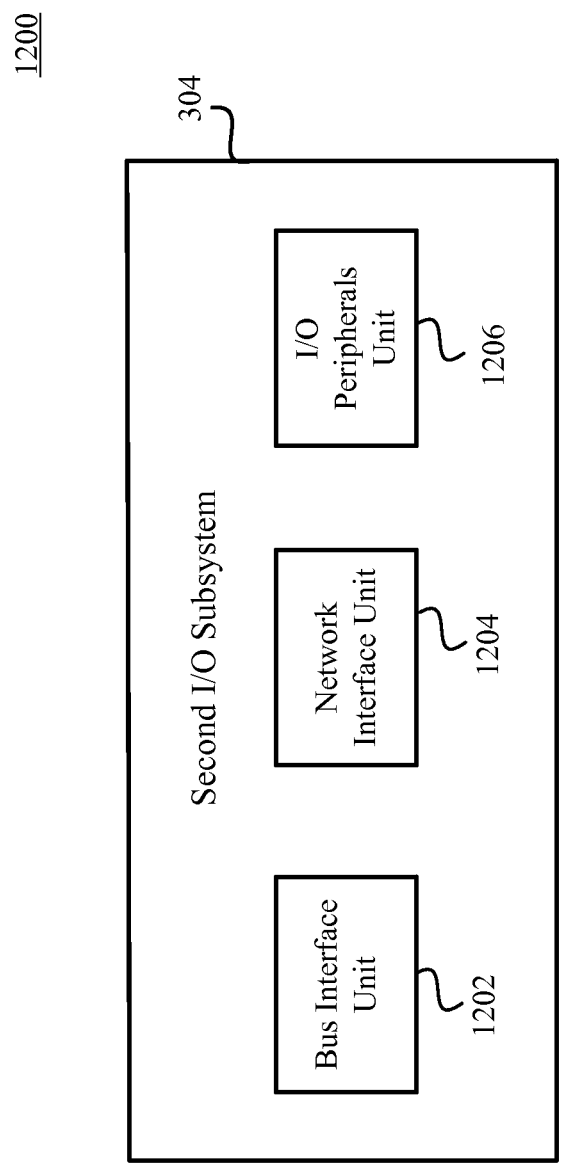
FIG. 12 illustrates a block diagram of a second I/O subsystem according to certain embodiments of the technology.

FIG. 12 illustrates some components of the second I/O subsystem 304. The second I/O subsystem 304 may include a bus interface unit 1202, a network interface unit 1204 and an I/O peripherals unit 1206. In some embodiments, the second I/O subsystem 304 may be part of the I/O subsystem 114 as discussed previously with reference to FIG. 7.

The bus interface unit 1202 may include one or more bus interfaces for communication with internal or external components. For example, the bus interface unit 1202 may include a first interface to communicate with the host system 104, e.g., interface 348. In some embodiments, the first interface may be a PCIe interface. For example, the bus interface unit 1202 may include one or more PCIe ports to connect to other PCIe ports. The bus interface unit 1202 may include a Root Complex (RC) port and an EndPoint port (EP). In some embodiments, the server compute subsystem 204 may communicate with the host system 104 via a PCIe port in the second I/O subsystem 304 and a PCIe port in the host system 104 using the interface 348. The bus interface unit 1202 may include a second interface to connect with the I/O steering engine 112 (e.g., to connect with the interface unit 802 with reference to FIG. 8). For example, the I/O steering engine 112 may connect the second I/O resources in the second I/O subsystem 304 to either the network compute subsystem 202 or to the server compute subsystem 204 using the second interface.

The network interface unit 1204 may include a third interface to connect to a network. In some embodiments, the network interface unit 1204 may include one or more Ethernet MACs (e.g., 10/25/40/50 Gb/sec) to connect to an Ethernet network. In some instances, the Ethernet MACs may provide Ethernet ports to interface to a PHY (physical layer) device for connecting to a network.

The I/O peripherals unit 1206 may include one or more peripheral devices. For example, the I/O peripherals unit 1206 may include one or more peripheral devices such as UARTs, I2C, GPIOs, SATA controllers, SPI ports, SERDES (Serialize-De-serialize) interface, etc. In some embodiments, the I/O peripherals unit 1206 may include different types and numbers of I/O devices than the I/O peripherals unit 1106 discussed with reference to FIG. 11. For example, in some instances, the I/O peripherals unit 1206 may include more number of SATA controllers as compared to I/O peripherals unit 1106. In some instances, only the I/O peripherals unit 1206 may include GPIOs and only the I/O peripherals unit 1106 may include UARTs.

Figure 13:
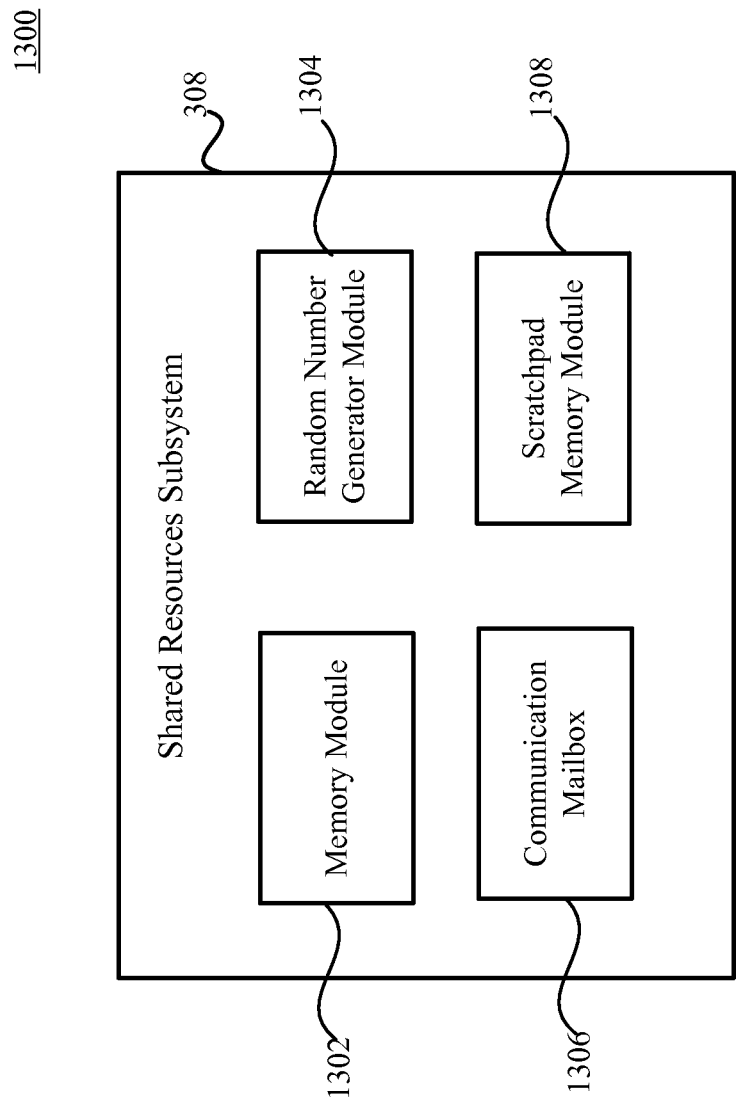
FIG. 13 illustrates a block diagram of the shared resources subsystem according to certain embodiments of the technology.

FIG. 13 illustrates some components of the shared resources subsystem 308. In embodiments of the technology, the shared resources subsystem 308 may include components that may not include process states. The shared resources subsystem 308 may include a memory module 1302, a random generator module 1304, a communication mailbox 1306 and a scratchpad memory module 1308.

The memory module 1302 may include non-volatile memory storage such as flash memory. For example, the memory module 1302 may include an embedded multimedia controller (eMMC) or secure digital (SD) to provide low level flash memory management. In some embodiments, the memory module 1302 may be used to store control code e.g., BIOS (Basic Input/Output System), boot loader, etc. For example, the memory module 1302 may include code that may be shared by both the compute subsystems.

The random generator module 1304 may be configured to generate a random sequence of numbers or symbols. For example, the random numbers may be used for cryptographic applications such as encryption of data or any such applications. In some embodiments, the random generator module 1304 may be used to generate a random number or sequence that may be used by the management compute subsystem 206 for authentication of each compute subsystem before powering up each compute subsystem after power on or reboot.

The communication mailbox 1306 may be used to facilitate communication among different processes associated with the two subsystems. For example, the communication mailbox 1306 may be used as an inter-process communication module for exchange of data for various functions such as message passing, synchronization, shared memory and remote procedure calls (RPC).

The scratchpad memory module 1308 may be used for temporary storage of data that may be used by both the subsystems. In some embodiments, the scratchpad memory module 1308 may include a high speed memory (e.g., 2 MB SRAM) to store small amounts of data for rapid retrieval, e.g., instructions or intermediate values.

Figure 14:
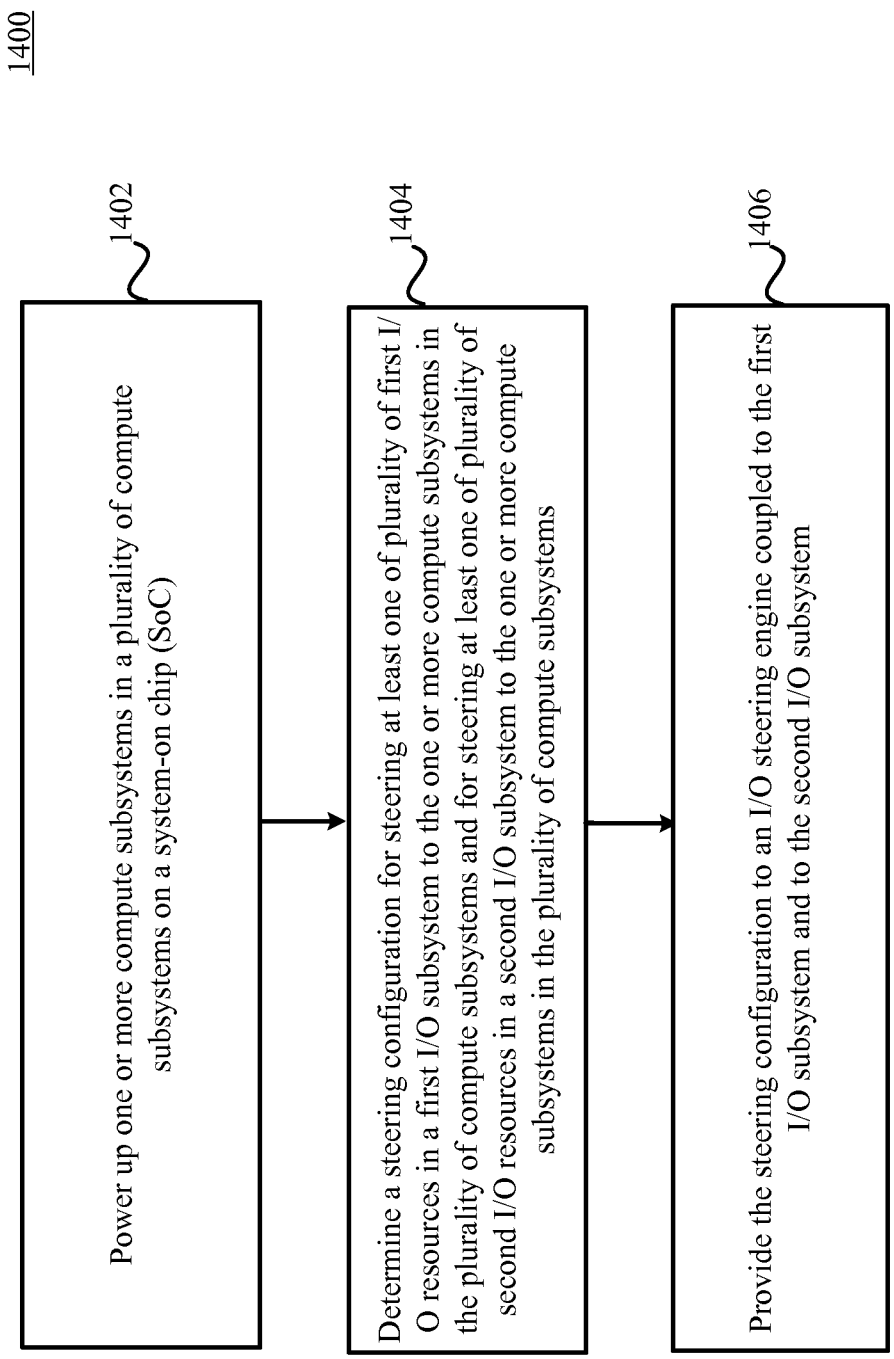
FIG. 14 illustrates a flow diagram according to certain embodiments of the technology.

FIG. 14 illustrates a flow diagram 1400 according to one or more aspects of the technology. Some or all of the process 1400 (or any other processes described herein, or variations and/or combinations thereof) may be performed under the control of one or more computer systems configured with executable instructions and may be implemented as code (e.g., firmware, executable instructions, one or more computer programs or one or more applications) executing collectively on one or more processors, or by hardware or combinations thereof. The code may be stored on a computer-readable storage medium, for example, in the form of a computer program that may include a plurality of instructions executable by one or more processors. The computer-readable storage medium may be non-transitory.

At step 1402, one or more compute subsystems in a plurality of compute subsystems may be powered up on a system-on chip (SoC). For example, in some embodiments, the network compute subsystem 202 and the server compute subsystem 204 may be powered up, wherein the server compute subsystem 204 is configured to provide compute services and the network compute subsystem 202 is configured to at least manage network traffic for the host system 104 and the server compute subsystem 202. For example, referring back to FIG. 3, the management compute subsystem 206 may power up the network compute subsystem 202 and the server compute subsystem 204. In some embodiments, the management compute subsystem 206 may allocate processor and memory resources to each compute subsystem after power up based on a configuration of the SoC 102. For example, in some instances, the SoC 102 may be configured to provide high performance networking services, high performance compute services, networking only services or server only services.

At step 1404, a steering configuration is determined for steering at least one of plurality of first I/O resources in a first I/O subsystem to the one or more compute subsystems in the plurality of compute subsystems and for steering at least one of plurality of second I/O resources in a second I/O subsystem to the one or more compute subsystems in the plurality of compute subsystems. Referring back to FIG. 3, the management compute subsystem 206 may determine a steering configuration for steering at least one of plurality of first I/O resources in the first I/O subsystem 302 to the network compute subsystem 202 or to the server compute subsystem 204 and for steering at least one of plurality of second I/O resources in the second I/O subsystem 304 to the network compute subsystem 202 or to the server compute subsystem 204. In some embodiments, the management compute subsystem 206 may determine a steering configuration to steer one or more accelerators to the network compute subsystem 202 or to the server compute subsystem 204, as discussed previously with reference to FIGS. 4A-4C, 5 and 6. As discussed with reference to FIG. 3, in some instances, the management compute subsystem 206 may determine the steering configuration to steer the appropriate number and types of I/O resources to each compute subsystem. For example, in some instances, more number of I/O resources and accelerators may be steered to the networking compute subsystem 202 as compared to the server compute subsystem 204.

At step 1406, the steering configuration is provided to an I/O steering engine coupled to the first I/O subsystem and to the second I/O subsystem. Referring back to FIG. 3, the management compute subsystem 206 may provide the steering configuration to the I/O steering engine 112 coupled to the first I/O subsystem 302 and to the second I/O subsystem 304. In some embodiments, the steering engine 112 may steer the appropriate number and types of I/O resources and accelerators to the plurality of compute subsystems, e.g., the network compute subsystem 202 and the server compute subsystem 204.

Embodiments of the disclosed technology can provide the flexibility of steering the I/O resources and accelerators to more than one compute subsystems on a SoC. The ability to better utilize the I/O resources and accelerators on the SoC can result in improved network and storage bandwidth provided by the host system for various compute services.

Figure 15:
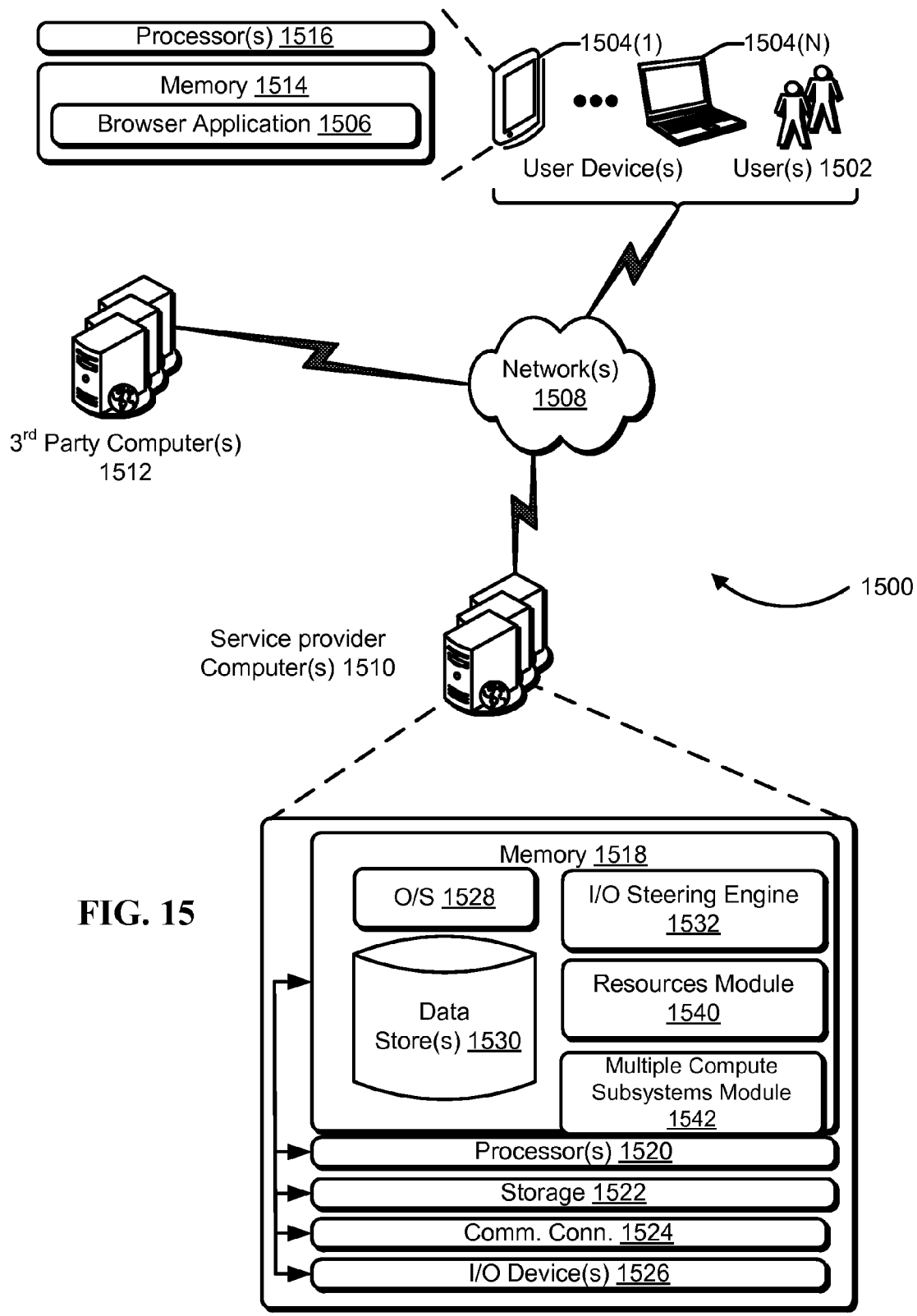
FIG. 15 illustrates an exemplary architecture for features and systems described herein that includes one or more service provider computers and/or a user device connected via one or more networks, according to at least one exemplary embodiment.

FIG. 15 illustrates an exemplary architecture for features and systems described herein that includes one or more service provider computers and/or a user device connected via one or more networks, according to at least one exemplary embodiment. The devices discussed in FIGS. 1-13, may use one or more components of the computing devices described in FIG. 15 or may represent one or more computing devices described in FIG. 15. In architecture 1500, one or more users 1502 may utilize user computing devices 1504(1)-(N) (collectively, user devices 1504) to access application 1506 (e.g., a web browser or mobile device application), via one or more networks 1508. In some aspects, application 1506 may be hosted, managed and/or provided by a computing resources service or service provider. One or more service provider computers 1510 may provide a native application which is configured to run on user devices 1504 which user(s) 1502 may interact with. Service provider computer(s) 1510 may, in some examples, provide computing resources such as, but not limited to, client entities, low latency data storage, durable data storage, data access, management, virtualization, cloud-based software solutions, electronic content performance management, etc. Service provider computer(s) 1510 may also be operable to provide web hosting, computer application development and/or implementation platforms, combinations of the foregoing or the like to user(s) 1502. Service provider computer(s) 1510, in some examples, may communicate with one or more third party computers 1512.

In some examples, network(s) 1508 may include any one or a combination of many different types of networks, such as cable networks, the Internet, wireless networks, cellular networks and other private and/or public networks. While the illustrated example represents user(s) 1502 accessing application 1506 over network(s) 1508, the described techniques may equally apply in instances where user(s) 1502 interact with service provider computer(s) 1510 via user device(s) 1504 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1506 may allow user(s) 1502 to interact with service provider computer(s) 1510 such as to access web content (e.g., web pages, music, video, etc.). Service provider computer(s) 1510, perhaps arranged in a cluster of servers or as a server farm, may host application 1506 and/or cloud-based software services. Other server architectures may also be used to host application 1506. Application 1506 may be capable of handling requests from many users 1502 and serving, in response, various item web pages. Application 1506 can provide any type of website that supports user interaction, including social networking sites, online retailers, informational sites, blog sites, search engine sites, news and entertainment sites and so forth. As discussed above, the described techniques can similarly be implemented outside of application 1506, such as with other applications running on user device(s) 1404.

User device(s) 1504 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1504 may be in communication with service provider computer(s) 1510 via network(s) 1508, or via other network connections. Additionally, user device(s) 1504 may be part of the distributed system managed by, controlled by or otherwise part of service provider computer(s) 1510 (e.g., a console device integrated with service provider computers 1510).

In one illustrative configuration, user device(s) 1504 may include at least one memory 1514 and one or more processing units (or processor(s)) 1516. Processor(s) 1516 may be implemented as appropriate in hardware, computer-executable instructions, firmware, or combinations thereof. Computer-executable instruction or firmware implementations of processor(s) 1516 may include computer-executable or machine-executable instructions written in any suitable programming language to perform the various functions described. User device(s) 1504 may also include geo-location devices (e.g., a global positioning system (GPS) device or the like) for providing and/or recording geographic location information associated with user device(s) 1504.

Memory 1514 may store program instructions that are loadable and executable on processor(s) 1516, as well as data generated during the execution of these programs. Depending on the configuration and type of user device(s) 1504, memory 1514 may be volatile (such as random access memory (RAM)) and/or non-volatile (such as read-only memory (ROM), flash memory, etc.). User device(s) 1504 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1514 may include multiple different types of memory, such as static random access memory (SRAM), dynamic random access memory (DRAM), or ROM.

Turning to the contents of memory 1514 in more detail, memory 1514 may include an operating system and one or more application programs or services for implementing the features disclosed herein including at least a user provided input element or electronic service web page, such as via browser application 1506 or dedicated applications (e.g., smart phone applications, tablet applications, etc.). Browser application 1506 may be configured to receive, store and/or display a website or other interface for interacting with service provider computer(s) 1510. Additionally, memory 1514 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1504.

In some aspects, service provider computer(s) 1510 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1510 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1510 may be in communication with user device(s) 1504 and/or other service providers via network(s) 1508, or via other network connections. Service provider computer(s) 1510 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1510 may include at least one memory 1518 and one or more processing units (or processor(s)) 1520. Processor(s) 1520 may be implemented as appropriate in hardware, computer-executable instructions, firmware or combinations thereof. Computer-executable instruction or firmware implementations of processor(s) 1520 may include computer-executable or machine-executable instructions written in any suitable programming language to perform the various functions described.

In some instances, hardware processor(s) 1520 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1518 may store program instructions that are loadable and executable on processor(s) 1520, as well as data generated during the execution of these programs. Depending on the configuration and type of service provider computer(s) 1510, memory 1518 may be volatile (such as RAM) and/or non-volatile (such as ROM, flash memory, etc.). Service provider computer(s) 1510 or servers may also include additional storage 1522, which may include removable storage and/or non-removable storage. The additional storage 1522 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1518 may include multiple different types of memory, such as SRAM, DRAM, or ROM.

Memory 1518, the additional storage 1522, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 1518 and the additional storage 1522 are all examples of computer storage media. Additional types of computer storage media that may be present in service provider computer(s) 1510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1510. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1510 may also contain communications connection(s) 1524 that allow service provider computer(s) 1510 to communicate with a stored database, another computing device or server, user terminals and/or other devices on network(s) 1508. Service provider computer(s) 1510 may also include I/O device(s) 1526, such as a keyboard, a mouse, a pen, a voice input device, a touch input device, a display, speakers, a printer and the like.

Memory 1518 may include an operating system 1528, one or more data stores 1530 and/or one or more application programs or services for implementing the features disclosed herein, including optionally an I/O steering engine 1532, resources module 1540 and a multiple compute subsystems module 1542. In some embodiments, the resources module 1540 may include a plurality of I/O resources and accelerators. In some embodiments, the I/O steering engine 1532 may be similar to the I/O steering engine 112. The multiple compute subsystems module 1542 may include the network compute subsystem 202 and the server compute subsystem 204. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 15, and/or functions described herein can be provided by one or more modules that exist as separate modules and/or module functions described herein can be spread over multiple modules.

Figure 16:
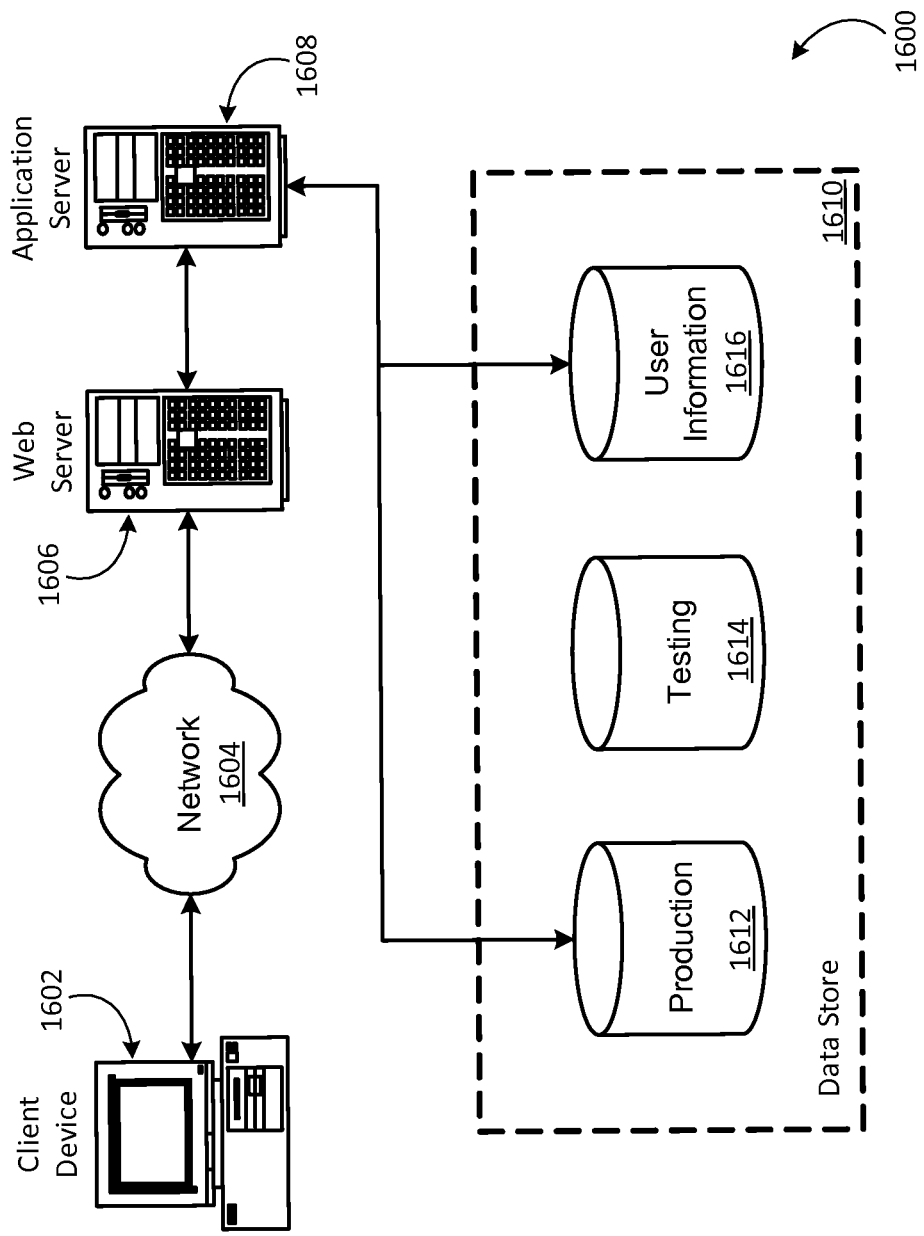
FIG. 16 illustrates an environment in which various embodiments can be implemented.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system on a chip (SoC) configured to communicate with a host system, the SoC comprising:
    a server compute subsystem for providing compute services;
    a network compute subsystem for at least managing network traffic for the host system and the server compute subsystem;
    a first input/output (I/O) subsystem comprising a plurality of first I/O resources, wherein the first I/O subsystem includes a first interface to communicate with the host system, a second interface to communicate with a network and a third interface to communicate with an I/O steering engine;
    a second I/O subsystem comprising a plurality of second I/O resources; and
    the I/O steering engine coupled to the first I/O subsystem and the second I/O subsystem, the I/O steering engine configured to:
        steer at least one of the plurality of first I/O resources to the server compute subsystem or to the network compute subsystem; and
        steer at least one of the plurality of second I/O resources to the server compute subsystem or to the network compute subsystem.

2. The SoC of claim 1, wherein the second I/O subsystem further includes a fourth interface to communicate with the host system, a fifth interface to communicate with the network and a sixth interface to communicate with the I/O steering engine.

3. The SoC of claim 1, further comprising an accelerator subsystem comprising one or more accelerators, wherein the I/O steering engine is further configured to steer at least one of the accelerators to the server compute subsystem or to the network compute subsystem.

4. A system on a chip (SoC) configured to communicate with a host system, the SoC comprising:
    a plurality of compute subsystems;
    a first input/output (I/O) subsystem comprising a plurality of first I/O resources, wherein the first I/O subsystem includes a first interface to communicate with the host system, a second interface to communicate with a network and a third interface to communicate with an I/O steering engine; and
    the I/O steering engine coupled to the first I/O subsystem, the I/O steering engine configured to direct at least one of the plurality of first I/O resources to one or more compute subsystems in the plurality of compute subsystems.

5. The SoC of claim 4, the SoC further comprising a second I/O subsystem comprising a plurality of second I/O resources, wherein the I/O steering engine is further configured to direct at least one of the plurality of second I/O resources to the one or more compute subsystems in the plurality of compute subsystems.

6. The SoC of claim 5, wherein the second I/O subsystem includes a fourth interface to communicate with the host system, a fifth interface to communicate with a network and a sixth interface to communicate with the I/O steering engine.

7. The SoC of claim 4, the SoC further comprising an accelerator subsystem comprising one or more accelerators, wherein the I/O steering engine is further configured to direct at least one of the accelerators to the one or more compute subsystems in the plurality of compute subsystems.

8. The SoC of claim 4, the SoC further comprising a management compute subsystem, wherein the management compute subsystem is configured to provide a steering configuration to the I/O steering engine.

9. The SoC of claim 4, wherein the plurality of compute subsystems include a server compute subsystem for providing compute services and a network compute subsystem for managing network traffic for the host system and the server compute subsystem.

10. The SoC of claim 9, wherein the I/O steering engine is configured to direct one or more of the plurality of first I/O resources to the server compute subsystem and one or more of the plurality of second I/O resources to the network compute subsystem.

11. The SoC of claim 9, wherein the I/O steering engine is configured to direct one or more of the plurality of first I/O resources and one or more of the plurality of second I/O resources to the network compute subsystem.

12. The SoC of claim 9, wherein the I/O steering engine is configured to direct one or more of the plurality of first I/O resources and one or more of the plurality of second I/O resources to the server compute subsystem.

13. The SoC of claim 9, wherein the I/O steering engine is coupled to the network compute subsystem via a network compute subsystem cache coherent fabric and to the server compute subsystem via a server compute subsystem cache coherent fabric.

14. The SoC of claim 9, the SoC further comprising an accelerator subsystem comprising a plurality of accelerators, wherein the I/O steering engine is further configured to direct one or more of the plurality of accelerators to the network compute subsystem and one or more of the plurality of accelerators to the server compute subsystem.

15. A method for steering input/output (I/O) resources in a System-on-Chip (SoC), the method comprising:
    activating one or more compute subsystems in a plurality of compute subsystems;
    determining a steering configuration for steering at least one of a plurality of first I/O resources in a first I/O subsystem to the one or more compute subsystems and for steering at least one of plurality of second I/O resources in a second I/O subsystem to the one or more compute subsystems, wherein the first I/O subsystem includes a first interface to communicate with the host system, a second interface to communicate with a network and a third interface to communicate with an I/O steering engine; and
    providing the steering configuration to the I/O steering engine coupled to the first I/O subsystem and to the second I/O subsystem.

16. The method of claim 15, wherein the plurality of compute subsystems include a server compute subsystem for providing compute services and a network compute subsystem for managing network traffic for the host system and the server compute subsystem.

17. The method of claim 16, wherein one or more of the plurality of first I/O resources and one or more of the plurality of second I/O resources are steered to the network compute subsystem.

18. The method of claim 16, wherein one or more of the plurality of first I/O resources and one or more of the plurality of second I/O resources are steered to the server compute subsystem.

* * * * *